(12) United States Patent
Taherzadeh Boroujeni et al.

(10) Patent No.: US 12,040,871 B2
(45) Date of Patent: Jul. 16, 2024

(54) SYSTEMS AND METHODS FOR CONFIGURING BEAM-SWITCHING ACKNOWLEDGEMENT

(71) Applicant: QUALCOMM Incorporated, San Diego, CA (US)

(72) Inventors: Mahmoud Taherzadeh Boroujeni, San Diego, CA (US); Tao Luo, San Diego, CA (US); Sony Akkarakaran, Poway, CA (US); Junyi Li, Fairless Hills, PA (US); Iyab Issam Sakhnini, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 17/316,088

(22) Filed: May 10, 2021

(65) Prior Publication Data

US 2021/0376903 A1 Dec. 2, 2021

Related U.S. Application Data

(60) Provisional application No. 63/032,066, filed on May 29, 2020, provisional application No. 63/032,478, filed on May 29, 2020.

(51) Int. Cl.
| | |
|---|---|
| *H04B 7/06* | (2006.01) |
| *H04W 72/044* | (2023.01) |
| *H04W 72/23* | (2023.01) |
| *H04L 1/18* | (2023.01) |

(52) U.S. Cl.
CPC ........ *H04B 7/0695* (2013.01); *H04W 72/046* (2013.01); *H04W 72/23* (2023.01); *H04L 1/18* (2013.01)

(58) Field of Classification Search
CPC . H04B 7/0695; H04B 7/0408; H04W 72/046; H04W 72/23; H04L 1/18; H04L 1/1671; H04L 1/1854
See application file for complete search history.

(56) References Cited

U.S. PATENT DOCUMENTS

| | | | |
|---|---|---|---|
| 2005/0254513 A1* | 11/2005 | Cave | H04W 16/28 370/278 |
| 2016/0270091 A1* | 9/2016 | Frenne | H04L 43/067 |
| 2019/0098586 A1* | 3/2019 | Akkarakaran | H04W 52/42 |
| 2020/0014444 A1* | 1/2020 | Mueck | H04B 7/0408 |
| 2020/0314788 A1* | 10/2020 | Yu | H04W 56/0065 |

\* cited by examiner

*Primary Examiner* — Kiet Tang
(74) *Attorney, Agent, or Firm* — Haynes and Boone, LLP /Qualcomm Incorporated

(57) ABSTRACT

Certain aspects of the subject matter described in this disclosure can be implemented in a method for wireless communication by base station. The method generally includes transmitting, to a user-equipment (UE), a packet indicating a beam switch associated with communication with the UE, receiving an acknowledgment (ACK) message, detecting that the ACK message is configured to indicate whether parsing of contents of the packet was successful, determining a timing of the beam switch based on the detection, and performing the beam switch in accordance with the determination of the timing.

30 Claims, 16 Drawing Sheets

SYSTEMS AND METHODS FOR CONFIGURING BEAM-SWITCHING ACKNOWLEDGEMENT

CROSS-REFERENCE(S)

This application is a nonprovisional of and claims priority under 35 U.S.C. 119 to commonly-owned and U.S. Provisional Application Nos. 63/032,478, and 63/032,066, both filed on May 29, 2020.

The aforementioned applications are hereby expressly incorporated by reference herein in their entirety.

TECHNICAL FIELD

The application technology discussed below relates to wireless communication systems, and more particularly to configuring a beam-switching acknowledgement with enhanced beam coverage, which may be utilized in $5^{th}$ Generation (5G) new radio (NR) networks.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

In a wireless system, BSs may broadcast synchronization signals such as primary synchronization signal (PSS), secondary synchronization signal (SSS), and extended synchronization signal (ESS), beam reference signal (BRS) and system information in a plurality of directional beams. In addition, the BSs may transmit other reference signals, such as channel state information reference signal (CSI-RS), over the beams to enable UEs to measure channels between the BS and corresponding UEs. A UE may perform initial cell acquisition by listening to the broadcast signals and perform signal measurements based on the synchronization signals, the BRS and/or other signals. The UE may determine receive signal strengths based on the received signals and select a cell and a beam within the selected cell for performing an access procedure.

In millimeter wave (mmW) systems, signal transmissions, both uplink (from UE to BS) and downlink (from BS to UE), are beamformed, as beamforming often mitigates high path loss at a higher frequency. For example, the BS may choose the best beam to transmit downlink signals. The best transmit beam, however, may change from time to time, due to various environment or channel factors. When the BS is going to change transmit beam, the BS needs to ensure that the UE has received the beam change instruction. Existing systems usually require the BS to inform the UE through the physical downlink control channel (PDCCH), and the UE sends an acknowledgement to the BS signaling the BS that the beam switching instruction has been received. The BS will only switch the transmit beam after an acknowledgement from the BS is received. This beam switching procedure, however, does not work for the physical uplink control channel (PUCCH) beam switch when the uplink beam is blocked or its coverage is insufficient, i.e., the acknowledgement signal is not received by the BS. In such cases, the BS is unable to switch to and use the best transmit beam at the time, and thus system performance may be compromised.

Therefore, there is a need to improve the beam switching procedure in the mmW systems.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include making beam management occur faster to reduce the duration of time that the UE and BS are configured on a relatively weak beam.

Certain aspects of the subject matter described in this disclosure can be implemented in a method for wireless communication by base station. The method generally includes transmitting, to a user-equipment (UE), a packet indicating a beam switch associated with communication with the UE, receiving an acknowledgment (ACK) message, detecting that the ACK message is configured to indicate whether parsing of contents of the packet was successful, determining a timing of the beam switch based on the detection, and performing the beam switch in accordance with the determination of the timing.

Certain aspects of the subject matter described in this disclosure can be implemented in a method for wireless communication by a user equipment (UE). The method generally includes receiving, from a base station (BS), a packet indicating a beam switch associated with communication with the BS, deciding whether an acknowledgment (ACK) message is to be configured to indicate whether parsing of contents of the packet was successful, generating the ACK message in accordance with the decision, transmitting the ACK message, determining a timing of the beam switch based on the decision, and performing the beam switch in accordance with the determination of the timing.

Certain aspects of the subject matter described in this disclosure can be implemented in an apparatus for wireless communication by a base station. The base station generally includes a memory; and one or more processor coupled to the memory, the one or more processors and the memory being configured to: transmit, to a user-equipment (UE), a packet indicating a beam switch associated with communication with the UE; receive an acknowledgment (ACK) message; detect that the ACK message is configured to indicate whether parsing of contents of the packet was successful; determine a timing of the beam switch based on the detection; and perform the beam switch in accordance with the determination of the timing.

Certain aspects of the subject matter described in this disclosure can be implemented in an apparatus for wireless communication by a user-equipment (UE). The UE generally includes a memory; and one or more processor coupled to the memory, the one or more processors and the memory being configured to: receive, from a base station (BS), a packet indicating a beam switch associated with communication with the BS; decide whether an acknowledgment (ACK) message is to be configured to indicate whether parsing of contents of the packet was successful; generate the ACK message in accordance with the decision; transmit the ACK message; determine a timing of the beam switch based on the decision; and perform the beam switch in accordance with the determination of the timing.

Certain aspects of the subject matter described in this disclosure can be implemented in an apparatus for wireless communication by a base station. The base station generally includes means for transmitting, to a user-equipment (UE), a packet indicating a beam switch associated with communication with the UE; means for receiving an acknowledgment (ACK) message; means for detecting that the ACK message is configured to indicate whether parsing of contents of the packet was successful; means for determining a timing of the beam switch based on the detection; and means for performing the beam switch in accordance with the determination of the timing.

Certain aspects of the subject matter described in this disclosure can be implemented in an apparatus for wireless communication by a user-equipment (UE). The UE generally includes means for receiving, from a base station (BS), a packet indicating a beam switch associated with communication with the BS; means for deciding whether an acknowledgment (ACK) message is to be configured to indicate whether parsing of contents of the packet was successful; means for generating the ACK message in accordance with the decision; means for transmitting the ACK message; means for determining a timing of the beam switch based on the decision; and means for performing the beam switch in accordance with the determination of the timing.

Certain aspects of the subject matter described in this disclosure can be implemented in a computer-readable medium having instructions stored thereon to cause a base station to: transmit, to a user-equipment (UE), a packet indicating a beam switch associated with communication with the UE; receive an acknowledgment (ACK) message; detect that the ACK message is configured to indicate whether parsing of contents of the packet was successful; determine a timing of the beam switch based on the detection; and perform the beam switch in accordance with the determination of the timing.

Certain aspects of the subject matter described in this disclosure can be implemented in a computer-readable medium having instructions stored thereon to cause a user-equipment (UE) to: receive, from a base station (BS), a packet indicating a beam switch associated with communication with the BS; decide whether an acknowledgment (ACK) message is to be configured to indicate whether parsing of contents of the packet was successful; generate the ACK message in accordance with the decision; transmit the ACK message; determine a timing of the beam switch based on the decision; and perform the beam switch in accordance with the determination of the timing.

For example, in an aspect of the disclosure, a method of wireless communication is provided. Data symbols via a physical downlink shared channel (PDSCH) transmission occasion are received, at a user equipment (UE) from a base station (BS). The UE then refrains from transmitting an acknowledgement message to the BS for a period of time after a last data symbol is received via the PDSCH transmission occasion. The UE parses a control element field from the received data symbols during the period of time and determines whether the control element filed contains a beam-switching command from the BS. The UE then transmits, from the UE to the BS, an acknowledgement message with coverage enhancement in response to determining that the control element field contains the beam-switching command.

In another aspect of the disclosure, a UE of wireless communication is disclosed. The UE includes a transceiver that receives, from a BS, data symbols via a PDSCH transmission occasion, and refrains from transmitting an acknowledgement message to the BS for a period of time after a last data symbol is received via the PDSCH transmission occasion, and a processor that parses a control element field from the received data symbols during the period of time, and determines whether the control element filed contains a beam-switching command from the BS. The transceiver further transmits, from the UE to the BS, an acknowledgement message with coverage enhancement in response to determining that the control element field contains the beam-switching command.

In another aspect of the disclosure, a processor-readable non-transitory storage medium storing processor-executable instructions for a UE of wireless communication is disclosed. The instructions are executable by a processor to perform operations comprising receiving, from a BS, data symbols via a PDSCH transmission occasion, refraining from transmitting an acknowledgement message to the BS for a period of time after a last data symbol is received via the PDSCH transmission occasion, parsing a control element field from the received data symbols during the period of time, determining whether the control element filed contains a beam-switching command from the BS, and transmitting, from the UE to the BS, an acknowledgement message with coverage enhancement in response to determining that the control element field contains the beam-switching command.

In another aspect of the disclosure, a system of wireless communication is disclosed. The system includes means for receiving, at a UE from a BS, data symbols via a PDSCH transmission occasion, means for refraining from transmitting an acknowledgement message to the BS for a period of time after a last data symbol is received via the PDSCH transmission occasion, means for parsing a control element field from the received data symbols during the period of time, means for determining whether the control element filed contains a beam-switching command from the BS; and means for transmitting, from the UE to the BS, an acknowledgement message with coverage enhancement in response to determining that the control element field contains the beam-switching command.

In another aspect of the disclosure, a method of wireless communication is disclosed. The BS configures a beam-switching command in a control element field in data for downlink transmission. The BS transmits to a UE, data symbols including the data representing the control element field via a PDSCH transmission occasion. The BS waits for a period of time after a last data symbol on the PDSCH transmission occasion is transmitted and determines whether an acknowledgement message is received from the UE after the period of time. The BS changes a beam configuration for downlink transmission in response to receiving the acknowledgement message after the period of time.

In another aspect of the disclosure, a BS of wireless communication is disclosed. The BS includes a processor that configures a beam-switching command in a control element field in data for downlink transmission, and a transceiver that transmits, to a user equipment (UE), data symbols including the data representing the control element field via a PDSCH transmission occasion. The processor waits for a period of time after a last data symbol on the PDSCH transmission occasion is transmitted before determining whether an acknowledgement message is received from the UE after the period of time, and changes a beam configuration for downlink transmission in response to receiving the acknowledgement message after the period of time.

In another aspect of the disclosure, a processor-readable non-transitory storage medium storing processor-executable instructions for a UE of wireless communication is disclosed. The instructions are executable by a processor to perform operations comprising configuring a beam-switching command in a control element field in data for downlink transmission, transmitting, by the BS to a UE, data symbols including the data representing the control element field via a PDSCH transmission occasion, waiting, by the BS, for a period of time after a last data symbol on the PDSCH transmission occasion is transmitted, determining whether an acknowledgement message is received from the UE after the period of time, and changing, by the BS, a beam configuration for downlink transmission in response to receiving the acknowledgement message after the period of time.

In another aspect of the disclosure, a system of wireless communication is disclosed. The system includes means for means for configuring, by a BS, a beam-switching command in a control element field in data for downlink transmission, means for transmitting, by the BS to a UE, data symbols including the data representing the control element field via a PDSCH transmission occasion, means for waiting, by the BS, for a period of time after a last data symbol on the PDSCH transmission occasion is transmitted, means for determining whether an acknowledgement message is received from the UE after the period of time, and means for changing, by the BS, a beam configuration for downlink transmission in response to receiving the acknowledgement message after the period of time.

Other aspects, features, and aspects of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
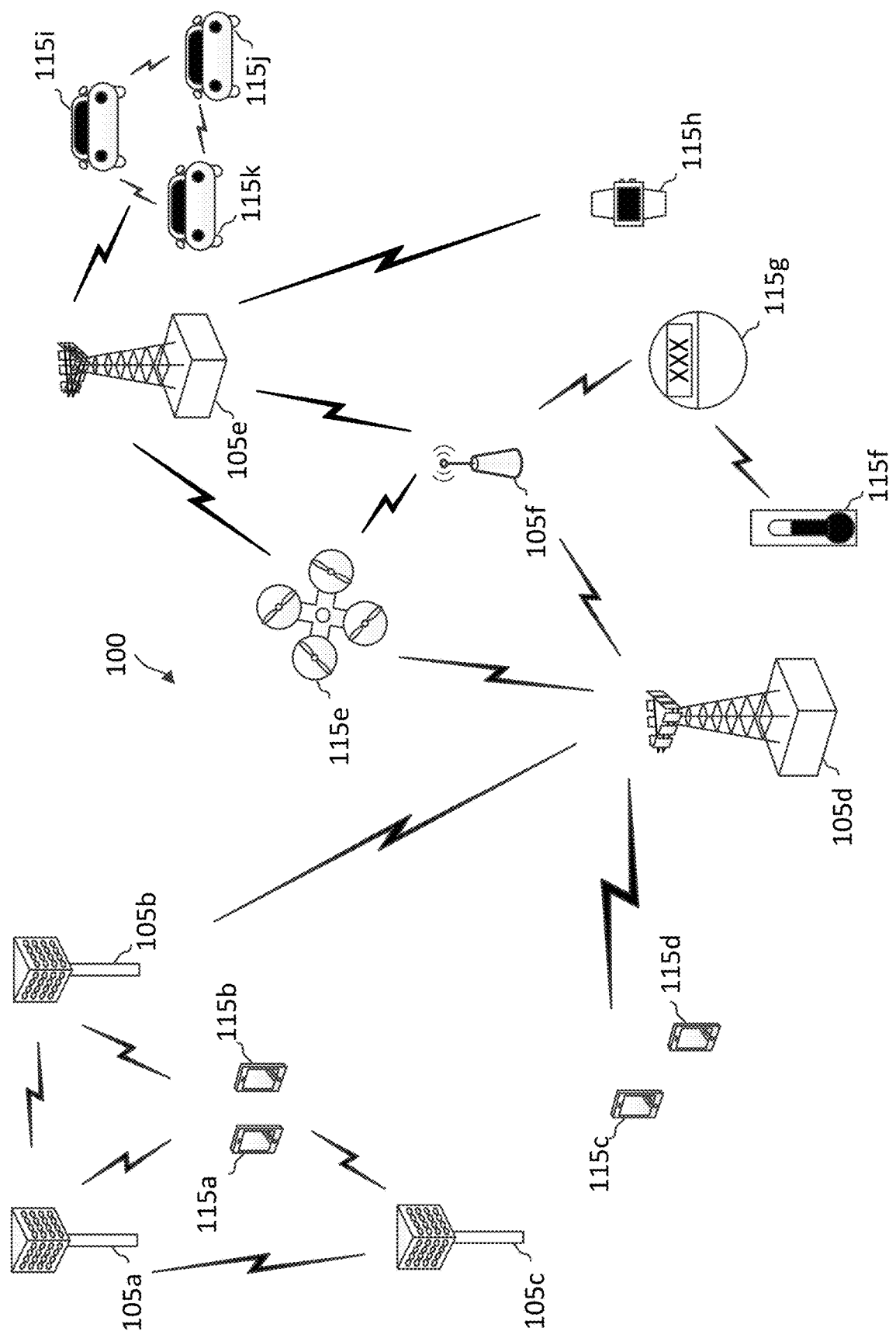
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented, or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

For example, in millimeter wave (mmW) systems, signal transmissions, both uplink (from UE to BS) and downlink (from BS to UE), are beamformed, as beamforming often mitigates high path loss at a higher frequency. For instance, the BS may choose the best beam to transmit downlink signals. The best transmit beam, however, may change from time to time, due to various environment or channel factors. When the BS is going to change transmit beam, the BS needs to ensure that the UE has received the beam change instruction.

Existing systems usually require the BS to inform the UE through the physical downlink control channel (PDCCH) when the BS is going to change the transmit beam. For example, different bits may be reserved in the downlink control information (DCI) field to convey the information of beam switch. Once the UE receive the beam switch information, e.g., from DCI through PDCCH, the UE can change its corresponding receive beam accordingly, and send an acknowledgement to the BS signaling the BS that the beam switching instruction has been received. The BS will only switch the transmit beam after an acknowledgement from the BS is received. This beam switching procedure, however, does not work for the physical uplink control channel (PUCCH) beam switch when the uplink beam is blocked or its coverage is insufficient, i.e., the acknowledgement signal is not received by the BS. In such cases, the BS is unable to switch to and use the best transmit beam at the time, and thus system performance may be compromised.

In view of the need to improve the accuracy and efficiency of the beam switch procedure, embodiments described herein provide a mechanism that transmits information relating to beam switch via the physical downlink shared channel (PDSCH) and allows additional time for the UE to parse beam switch information from the PDSCH. Specifically, the beam switch command may be contained in the medium access control (MAC) control element (CE) in the PDSCH. Upon receiving the PDSCH, the UE is allowed an extra amount of time, prior to sending an acknowledgement to the BS, to parse the MAC CE to determine whether a beam switch command is indicated in the MAC CE. If a beam switch command is indicated, the UE sends a coverage-enhanced acknowledgment to the BS to ensure the BS receives the acknowledgment. In this way, upon receipt of the acknowledgment from the UE, the BS will be able to change the transmit beam according to the currently best available beam. Thus, the transmission can be conducted via the best transmit beam at all time to improve system performance.

In some embodiments, the beam switching mechanism described herein may be implemented at the wireless communication network described in relation to FIG. 1.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

The BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control chaDCInnel (PDCCH) monitoring, physical uplink control channel (PUCCH), physical uplink shared channel (PUSCH), power control, and SRS.

After obtaining the MIB, the RMSI and/or the OSI, the UE 115 can perform a random-access procedure to establish a connection with the BS 105. In some examples, the random-access procedure may be a four-step random access procedure. For example, the UE 115 may transmit a random-access preamble and the BS 105 may respond with a random-access response. The random-access response (RAR) may include a detected random-access preamble identifier (ID) corresponding to the random-access preamble, timing advance (TA) information, a UL grant, a temporary cell-radio network temporary identifier (C-RNTI), and/or a backoff indicator. Upon receiving the random-access response, the UE 115 may transmit a connection request to the BS 105 and the BS 105 may respond with a connection response. The connection response may indicate a contention resolution. In some examples, the random-access preamble, the RAR, the connection request, and the connection response can be referred to as message 1 (MSG1), message 2 (MSG2), message 3 (MSG3), and message 4 (MSG4), respectively. In some examples, the random-access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some instances, the BS 105 may communicate data with the UE 115 using hybrid automatic request (HARQ) to improve communication reliability. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the component carrier to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information (e.g., UL and/or DL scheduling grants) from the BS. In an example, the BS 105 may configure the UE 115 with the BWPs, the CORESETS, and/or the PDCCH search spaces via RRC configurations.

In some aspects, the network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (e.g., a preamble signal sequence) is detected in the channel.

Further, the BS 105 may configure UEs 115 with narrowband operation capabilities (e.g., with transmission and/or reception limited to a BW of 20 MHz or less) to perform BWP hopping for channel monitoring and communications. Mechanisms for performing BWP hopping are described in greater detail herein.

Figure 2:
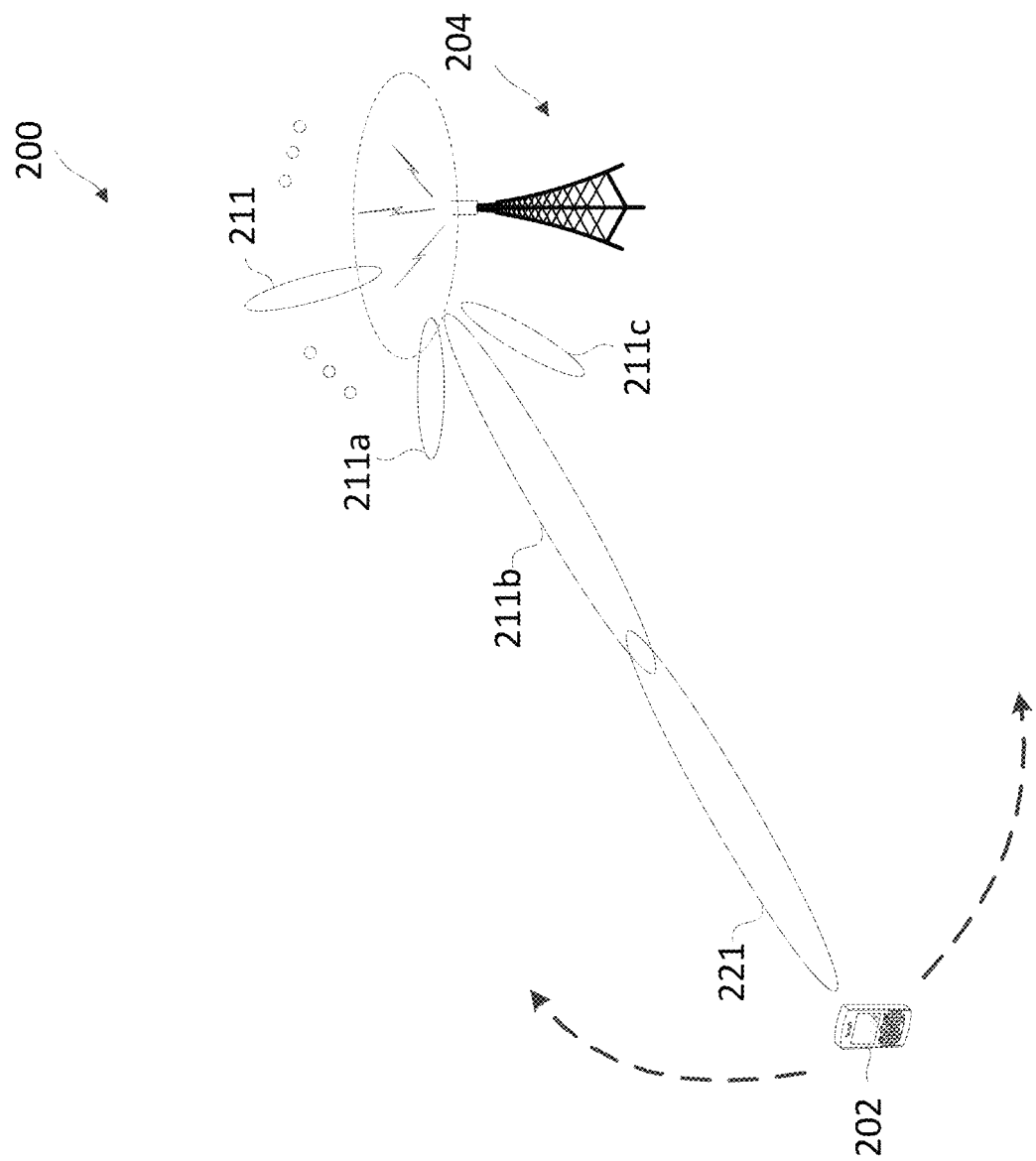
FIG. 2 illustrates a transmission scheme via beamforming in a wireless communication network 200 according to aspects of the present disclosure.

FIG. 2 illustrates a transmission scheme via beamforming in a wireless communication network 200 according to aspects of the present disclosure. The network 200 corresponds to a portion of the network 100. FIG. 2 illustrates one BS 204 and one UE 202 for purposes of simplicity of discussion, though it will be recognized that aspects of the present disclosure may scale to many more UEs 202 and/or BSs 204. The BS 204 corresponds to one of the BSs 104. The UE 202 corresponds to one of the UEs 102. The UE 202 and BS 204 may communicate with each other at any suitable frequencies.

In FIG. 2, BS 204 sends synchronization signals, BRSs, and system information over a plurality of directional beams 211 in a plurality of directions as shown by the dashed oval 220. To access the network 200, UE 202 listens to the synchronization signals and/or the BRSs and selects a beam for performing a random-access procedure. For example, UE 202 can receive the beams 211a, 211b, and 211c and selects the beam 211b for the random access. The UE 202 sends a random-access preamble over a beam 221 in the beam direction of the beam 211b and monitors for a RAR from BS 204. Upon detecting the random-access preamble, BS 204 sends a RAR over the beam 211b in the same beam direction at which the random-access preamble is received. The BS 204 sends the RAR over the beam 211b using an entire subframe. This can be resource inefficient when a large bandwidth is available. In addition, by the time BS 204 sends the RAR, UE 202 may have moved to a different location away from the beam 211b as shown by the dashed arrows. Thus, UE 202 may fail to receive the RAR from the beam 211b. An additional cause of RAR failure may be due to beam correspondence. Although UE 202 may retry for another random-access attempt after waiting for a period of time (e.g., a backoff period), the retry adds additional latency. Thus, sending a single random-access preamble over a single beam direction per random access attempt may not be robust enough to successfully complete the RACH procedure.

Figure 3A:
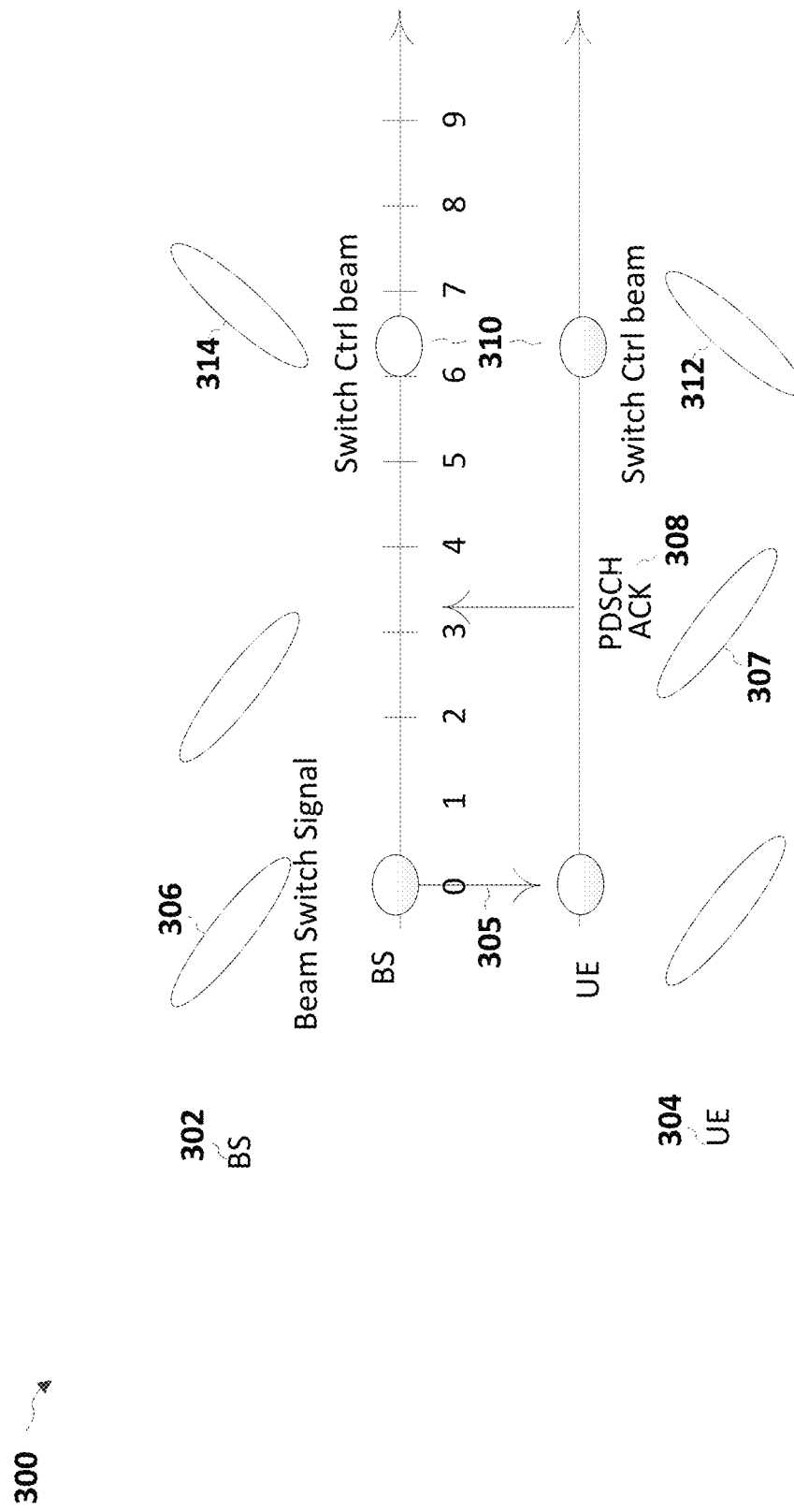
FIG. 3A is a diagram illustrating a beam change procedure in accordance with certain aspects of the disclosure.

In some embodiments, the BS 204 may select the best transmit beams among beams 211 at the time for downlink transmission. When the BS 204 determines that one or more transmit beams currently in use are no longer the best beams at the time, e.g., due to environment or channel conditions, FIG. 3A is a diagram 300 illustrating a beam change procedure in accordance with certain aspects of the disclosure. The diagram 300 includes an example of a control beam switch via between BS 302 and the UE 304. In one embodiment, the BS 302 may be similar to the BS 204 in FIG. 2, and the UE 304 may be similar to the BS 202 in FIG. 2.

In one embodiment, the BS 302 and UE 304 use a set of possible beams (e.g., TCI states) in NR for communication.

Specifically, information relating to the set of possible and available beams may be configured via RRC signaling from the BS 302 to UE 304. The MAC-CE or DCI from the BS 302 to the UE 304 may indicate a specific beam from the set of possible beams to be used. In some scenarios, the BS 302 may determine to switch to a different downlink beam that may be the best transmit beam at the time. The beam switch signal may be transmitted via MAC-CE or DCI, where the BS 302 can switch the control beam (e.g., 306) after reception of an ACK (e.g., 308) from the UE. In some instances, The UE sending the acknowledgement message (ACK) 308 to the BS, provides the BS with the necessary confirmation to switch to a new beam (e.g., 314).

Specifically, the BS 302 may transmit a downlink signal 305 which may include a beam switch signal, e.g., in the MAC-CE field, a UE-specific DCI, or a group-common DCI. The downlink signal 305 having the beam switch signal may be transmitted by the BS 302 using a currently configured beam 306. The UE 304 may receive the downlink signal 305 having the beam switch signal. Upon decoding of the downlink signal 305 having the beam switch signal, the UE 304 may transmit the ACK 308 to the BS 302. The ACK 308 is usually sent on the PUCCH to provide an acknowledgement of the downlink signal 305 received via a downlink channel (e.g., PDSCH). The BS 302, upon receipt of the ACK 308, may then switch to a new beam (e.g., 314). The UE 304, may also switch to a new beam (e.g., 312) that corresponds with the new beam (e.g., 314) of the BS 302.

The example of the beam switch procedure shown at diagram 300 may not work if the uplink beam 307 of the UE 304 for transmitting the ACK 308 is blocked or does not have sufficient coverage. In this case, the ACK 308 may not be properly received by the BS 302. However, the BS 302 must receive the ACK 308 from the UE 304 in order to switch to a new beam. Without properly receiving the ACK 3, the UE 304 may believe that the downlink beam at the BS 302 is to be changed, but the BS 302 may not change the downlink beam due to a lack of ACK. As such, the BS 302 and the UE 304 may experience a misalignment 310 of different transmit beams, and system performance may be compromised.

In view of the need to improve the beam switch procedure between the BS and the UE, embodiments described herein provide a timeline mechanism for beam-switching ACK with coverage enhancement to improve the receipt success of the ACK. Specifically, a timeline from the PDSCH transmission to ACK is designed in a way such that an additional period of time is allowed between the last data symbol on the PDSCH and the ACK. The additional period of time may allow the UE to decode and parse information from the received PDSCH data to determine whether a beam-switching command is indicated. If a beam-switching command is indicated, the UE may send an ACK with coverage enhancement instead of sending a regular ACK as previously configured. With coverage enhancement, the chance of successful transmission of the ACK can be significantly improved to ensure the BS receive the ACK.

Figure 3B:
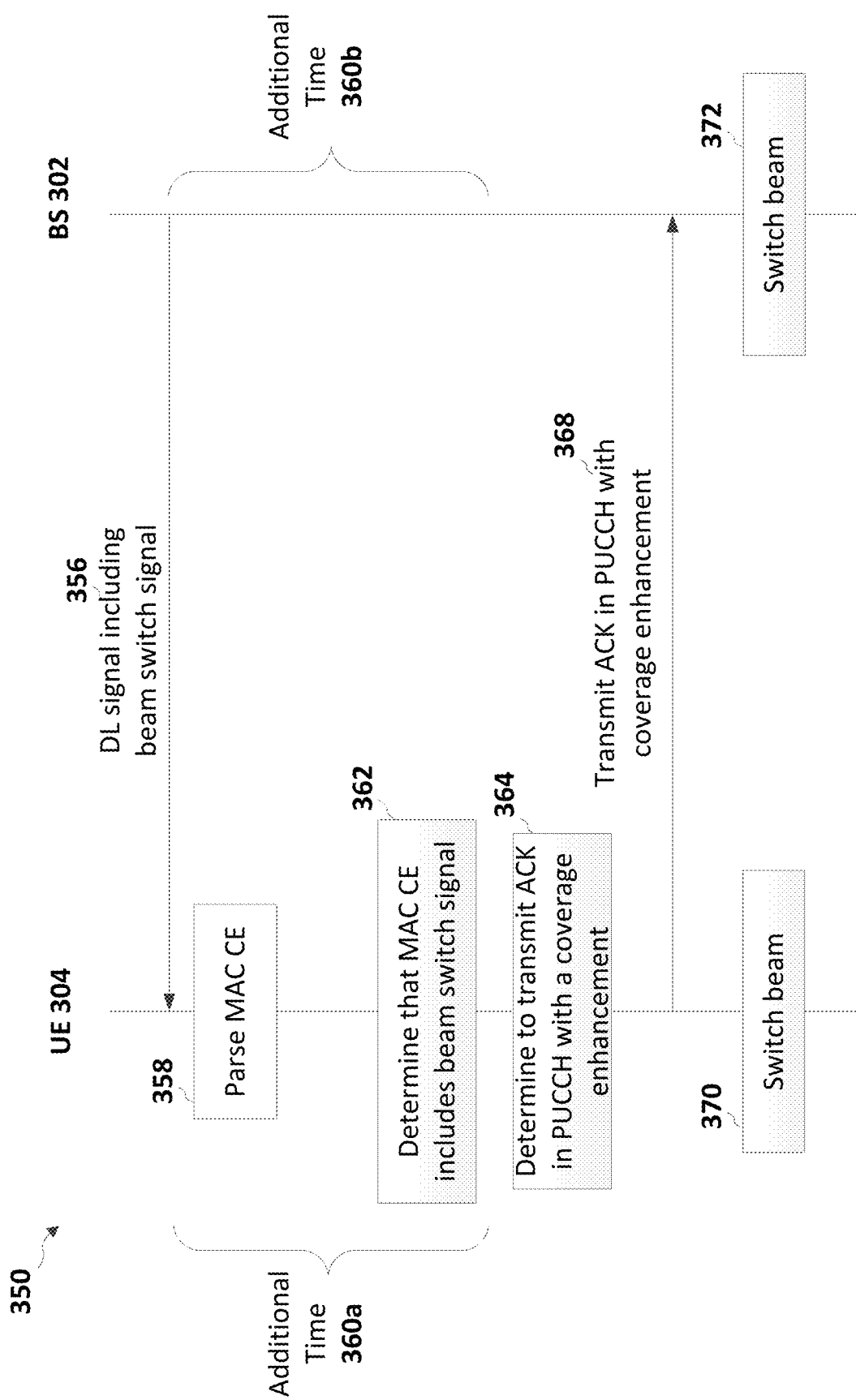
FIG. 3B illustrates an example diagram illustrating a timeline between the user equipment and the base station for acknowledgement transmission in a scenario of beam-switching as described in FIG. 3A, according to one aspect described herein.

FIG. 3B illustrates an example diagram illustrating a timeline 350 between the UE 304 and a BS 302 for ACK transmission in a scenario of beam-switching as described in FIG. 3A, according to one aspect described herein. The BS 302 may provide a cell serving the UE 304. The timeline 350 starts when the BS 302 transmits, to the UE 304, a downlink (DL) signal 356 including a beam switch signal. The beam switch signal may indicate that the BS 302 will change a transmit beam for downlink communication with the UE 304. In some aspects, the downlink signal 356 may include one or more data symbols transmitted via a PDSCH transmission occasion. In some aspects, the downlink signal 356 may indicate a beam switch signal in a specific header, such as but not limited to the MAC CE, a UE-specific DCI, or a group-common DCI.

Upon receiving the downlink signal 356 on PDSCH, the UE 304, may decode the downlink signal 356. Specifically, an additional period of time 360*a* is allowed at the UE 304 to parse information from MAC CE (or other header fields that may contain beam switching information), e.g., at 358. The UE 304 may ten determine whether the MAC CE contains beam switching information, e.g., at 362. During the additional period of time 360*a* for parsing MAC CE, the UE 304 does not transmit any ACK to the BS 302, even if the downlink signal 356 has been successfully received.

In the meantime, the BS 302, after transmitting the downlink signal 356, waits for an additional period of time 360*b*, before determining that the transmission of the downlink signal 356 is unsuccessful due to a lack of ACK. During the additional period of time 360*b*, the BS 302 also holds off on any transmission of the downlink signal 356.

When the UE 304 determines that the MAC CE includes a beam switching command during the additional period of time 360*a*, the UE 304 may then determine to transmit an ACK in PUCCH with coverage enhancement, e.g., at 364. Transmitting the ACK with coverage enhancement may ensure that the BS 302 receives the ACK. For example, the coverage enhancement may include transmitting the ACK in an expanded time or frequency resource than a previously configured time or frequency resource for ACK transmission within the PUCCH. For another example, the coverage enhancement may include repeating the transmission of the ACK at different frequency ranges or time instances within the PUCCH. In some aspects, the coverage enhancement of repeating the transmission of the ACK at different frequency ranges or time instances may comprise transmitting the ACK within a number of different beams that are currently available. In some aspects, the beam switch signal may comprise a configuration which indicates whether the UE is to use the coverage enhancement for transmitting the ACK. In some aspects, the beam switch signal may comprise a configuration which indicates the type or manner of coverage enhancement to be used by the UE to transmit the ACK. Further examples of coverage enhancement may be provided in FIGS. 8A-D.

The UE 304 may transmit the ACK in a PUCCH transmission occasion with coverage enhancement, e.g., at 368, upon the receipt of which, the BS 302 may switch the beam, e.g., at 372. Similarly, at the UE side, the UE 304 may switch beam, e.g., at 370, after transmitting the ACK with coverage enhancement. In this way, the UE 304 and the BS 302 may switch beams at substantially the same time such that any communication between the UE 304 and the BS 302 can be maintained on the same transmit beam(s) to avoid a loss of connection.

The timeline of ACK transmission including the additional time 360*a-b* on both the UE side and the BS side may be defined for both the UE 304 and the BS 302. For example, the additional period of time 360*a-b* may be defined in a form of a plurality of milliseconds (e.g., 0.5 milliseconds, etc.), or a plurality of symbol times, or a number of slots.

In some embodiments, the UE 3040 may configure the period of time 360*a* based on a processing capability of the UE such that the configured period of time 360*a* allows sufficient time for the UE to parse the control element field of the MAC message.

In some embodiments, the additional period of time 360*a-b* is a pre-configured parameter defined in a wireless communication protocol, e.g., the 5G standard. Bothe UE 304 and the BS 302 may be programmed with the pre-configured parameter for the period of time specified in the wireless communication protocol.

In some embodiments, the BS 302 may determine the additional period of time 360*b*. The BS 302 may then transmit an indication of the period of time 360*b* to the UE 304 via radio resource control (RRC) signaling or downlink control information (DCI). For example, the period of time may be determined based on any combination of a frequency range and a subcarrier spacing of the wireless communication between the BS and the UE, e.g., the period of time may be 0.5 milliseconds when the subcarrier spacing is 15 KHz, or 0.3 milliseconds or 0.25 milliseconds when the subcarrier spacing is 120 KHz, and/or the like.

Figure 4:
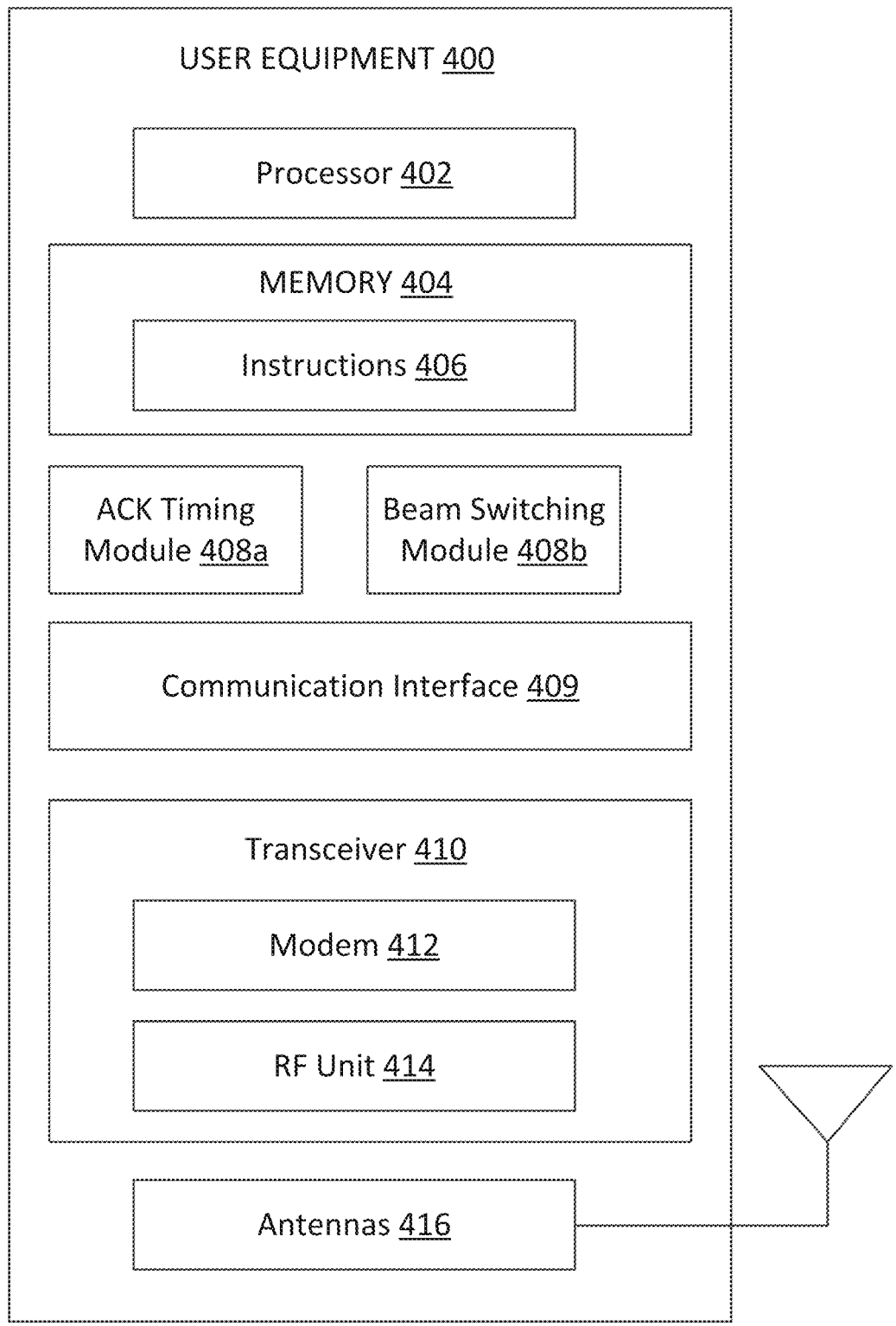
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1, UE 202 shown in FIG. 2, or UE 304 shown in other figures, for example. As shown, the UE 400 may include a processor 402, a memory 404, an ACK timing module 408*a*, a beam switching module 408*b*, a communication interface 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 3A-3C and 6A-10. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The ACK timing module 408*a* may communicate with the communication interface 409 to, for example, record the time when the last symbol on the PDSCH is received from another device. beam switching module 408*b* may communicate with the communication interface 409 to set, configure or switch a beam in use for uplink transmission. Each of the ACK timing module 408*a* and the beam switching module 408*b* may be implemented via hardware, software, or combinations thereof. For example, each of the ACK timing module 408*a* and the beam switching module 408*b* may be implemented as a processor, circuit, and/or instructions 406 stored in the memory 404 and executed by the processor 402. In some examples, the ACK timing module 408*a* and the beam switching module 408*b* can be integrated within the modem subsystem 412. For example, the ACK timing module 408*a* and the beam switching module 408*b* can be implemented by a combination of software components (e.g., executed by a DSP or a general processor) and hardware components (e.g., logic gates and circuitry) within the modem subsystem 412. In some examples, a UE may include one of the ACK timing module 408*a* and the beam switching module 408*b*. In other examples, a UE may include both the ACK timing module 408*a* and the beam switching module 408*b*.

Figure 6:
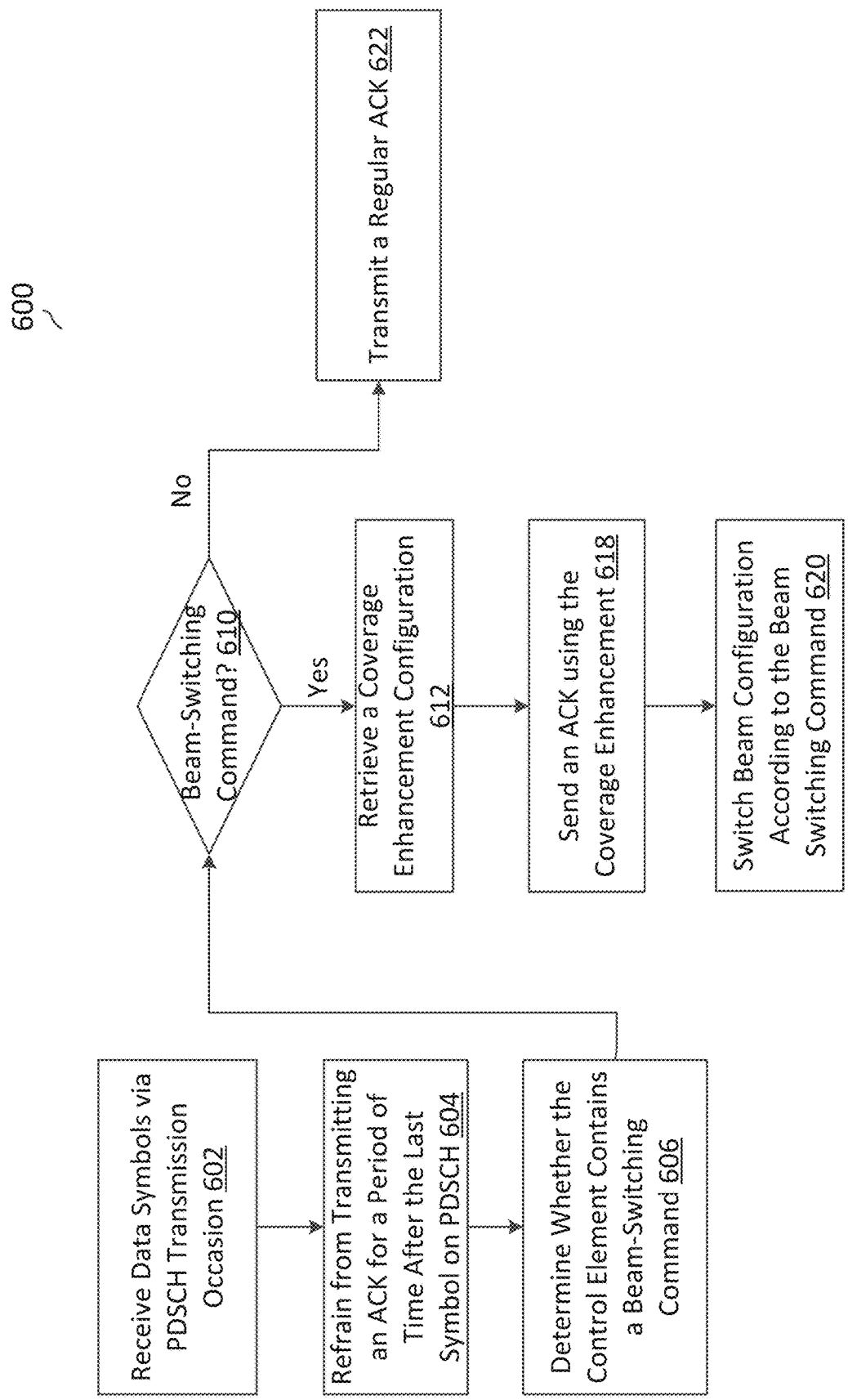
FIG. 6 illustrates a logic flow performed by the UE to implement the timeline for transmitting an acknowledgement with coverage enhancement for beam switching shown in FIG. 3B, according to some aspects of the present disclosure.

Each of the ACK timing module 408*a* and the beam switching module 408*b* may be used for various aspects of the present disclosure, for example, aspects of FIGS. 3B and 6-??. The ACK timing module 408*a* is configured to implement the timeline including an additional period of time upon receiving the last data symbol on the PDSCH and the start of transmitting the ACK. The beam switching module 408*b* is configured to switch a beam for uplink transmission after an ACK message is sent uplink, when a previously received downlink signal contains a beam switching command.

The communication interface 409 is configured to coordinate with the ACK timing module 408*a* and the beam switching module 408*b* to receive system information, RRC signaling that may contain a configuration for the additional period of time determined by the BS, send the ACK via PUCCH transmit occasion, and/or the like.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the RACH module 408, and/or the communication interface 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH, PUSCH, channel reports, ACK/NACKs) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., DL data blocks, PDSCH, PUSCH, BWP hopping configurations and/or instructions) to the RACH module 408 and/or communication interface 409 for processing. The antennas 416 may include multiple antennas of similar or different designs in order to sustain multiple transmission links. The RF unit 414 may configure the antennas 416.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
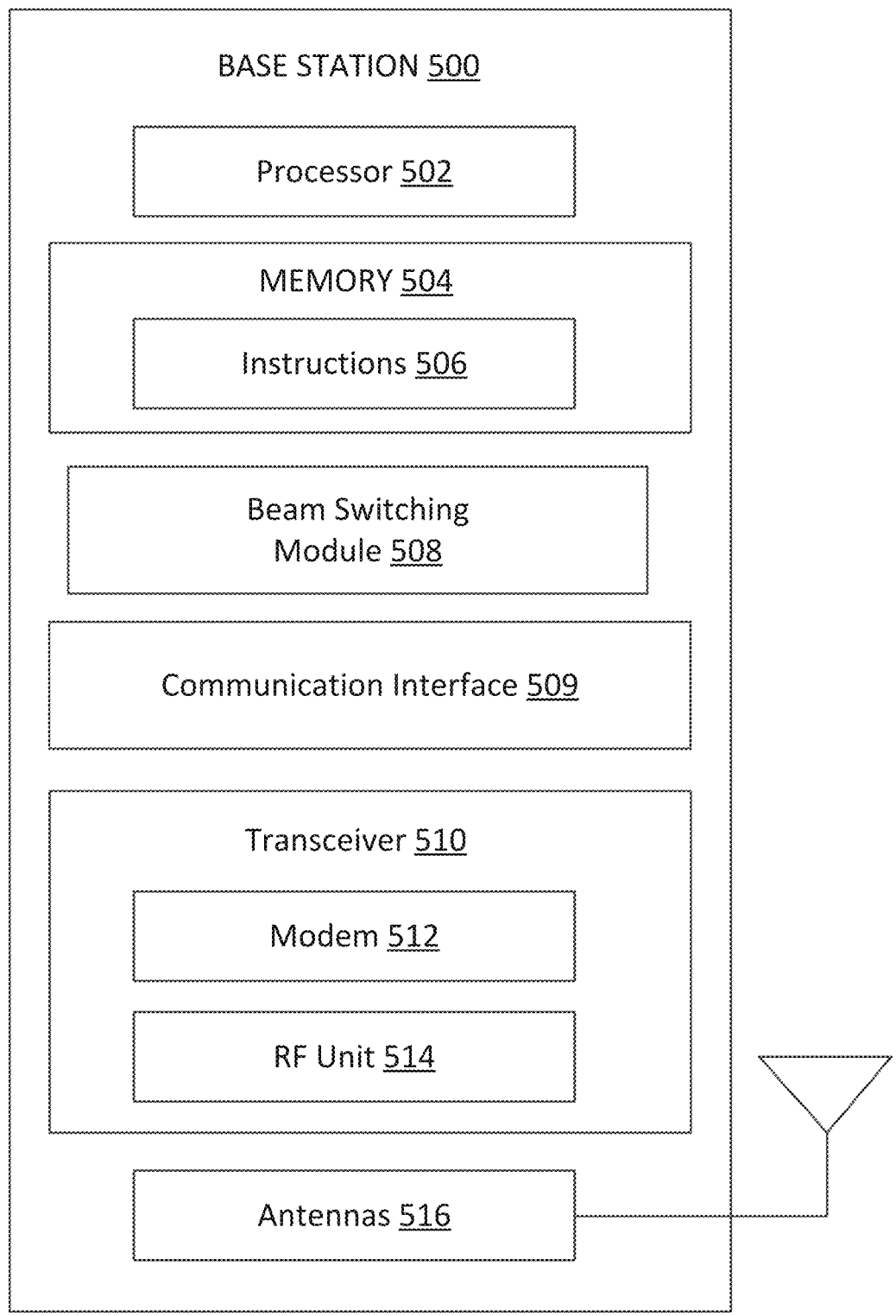
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 as discussed above in FIG. 1, BS 204 in FIG. 2, and BS 302 described in other figures, for example. As shown, the BS 500 may include a processor 502, a memory 504, a beam switching module 508, a communication interface 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-16, and 18. Instructions 506 may also be referred to as code, which may be interpreted broadly to include any type of computer-readable statement(s) as discussed above with respect to FIG. 4.

The beam switching module 508 may communicate with the communication interface 509 to set, configure, or change the transmit beam for transmit signals via the communication interface 509. The beam switching module 508 may be implemented via hardware, software, or combinations thereof. For example, the beam switching module 508 may be implemented as a processor, circuit, and/or instructions 506 stored in the memory 504 and executed by the processor 502. In some examples, the beam switching module 508 and the communication interface 509 can be integrated within the modem subsystem 512. For example, the beam switching module 508 and the communication interface 509 can be implemented by a combination of software components (e.g., executed by a DSP or a general processor) and hardware components (e.g., logic gates and circuitry) within the modem subsystem 512. In some examples, a UE may include one of the beam switching module 508 and the communication interface 509. In other examples, a UE may include both the beam switching module 508 and the communication interface 509.

The beam switching module 508 and the communication interface 509 may be used for various aspects of the present disclosure, for example, aspects of FIGS. 3 and 6-??. The beam switching module 508 is configured to transmit a beam switching command in MAC CE via a PDSCH transmission occasion to the UE. The beam switching module 508 is further configured to switch a currently configured beam to another beam that may be the best transmit beam at the time when an ACK from the UE is received.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., BWP hoping configurations and instructions, PDCCH, PDSCH) from the modem subsystem 512 (on outbound transmissions) or of transmissions originating from another source such as a UE 115 and 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to aspects of the present disclosure. The antennas 516 may further receive data messages transmitted from other devices and provide the received data messages for processing and/or demodulation at the transceiver 510. The transceiver 510 may provide the demodulated and decoded data (e.g., channel reports, PUSCH, PUCCH, HARQ ACK/NACKs) to the RACH module 508 and/or communication interface 509 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

FIG. 6 illustrates a logic flow 600 performed by the UE to implement the timeline for transmitting an ACK with coverage enhancement for beam switching shown in FIG. 3B, according to some aspects of the present disclosure.

Steps of the method 600 can be executed by a computing device (e.g., a processor, processing circuit, and/or other suitable component) of a wireless communication device or other suitable means for performing the steps. For example, a wireless communication device, such as the UE 115, UE 202, UE 304 or UE 400, may utilize one or more components, such as the processor 402, the memory 404, the ACK timing module 408a, the beam switching module 408b, the communication interface 409, the transceiver 410, the modem 412, and the one or more antennas 416, to execute the steps of method 600. As illustrated, the method 600 includes a number of enumerated steps, but aspects of the method 600 include additional steps before, after, and in between the enumerated steps. In some aspects, one or more of the enumerated steps may be omitted or performed in a different order.

At step 602, the UE may receive data symbols via a PDSCH transmission occasion, e.g., using a currently configured beam. At step 604, upon receiving the last data symbol via the PDSCH transmission occasion, the UE may refrain from transmitting an ACK message to the BS for a period of time. At step 606, the UE may parse a control element field from the received data symbols during the period of time. For example, the UE may decode the received downlink signal (e.g., 356 in FIG. 3B), and then parse information from the MAC CE, UE-specific DCI or a group-common DCI. At step 606, the UE may determine, via the parsing, whether the control element contains a beam switching command from the BS.

At decision step 610, if a beam-switching command is indicated, method 600 proceeds to step 612, at which the UE retrieve a previously configured coverage enhancement configuration. For example, the previously configured coverage enhancement may include an expanded time or frequency resources for transmitting the ACK, or a repetition manner for transmitting the ACK on different time or frequency resources.

At step 618, the UE sends to the BS an ACK using the coverage enhancement, e.g., the ACK 368 transmitted via PUCCH as shown in FIG. 3B. At step 620, the UE may switch the current beam configuration according to the beam switching command. For example, the UE may switch to the transmit beam indicated in the beam switching command parsed from MAC CE such that the UE may change its beam setting substantially at the same time with the BS.

At decision step 610, if a beam-switching command is not indicated, method 600 proceeds to step 622, at which the UE transmits to the BS, a regular ACK, e.g., with an existing coverage configuration with no coverage enhancement. No beam change will occur at the UE side.

Figure 7:
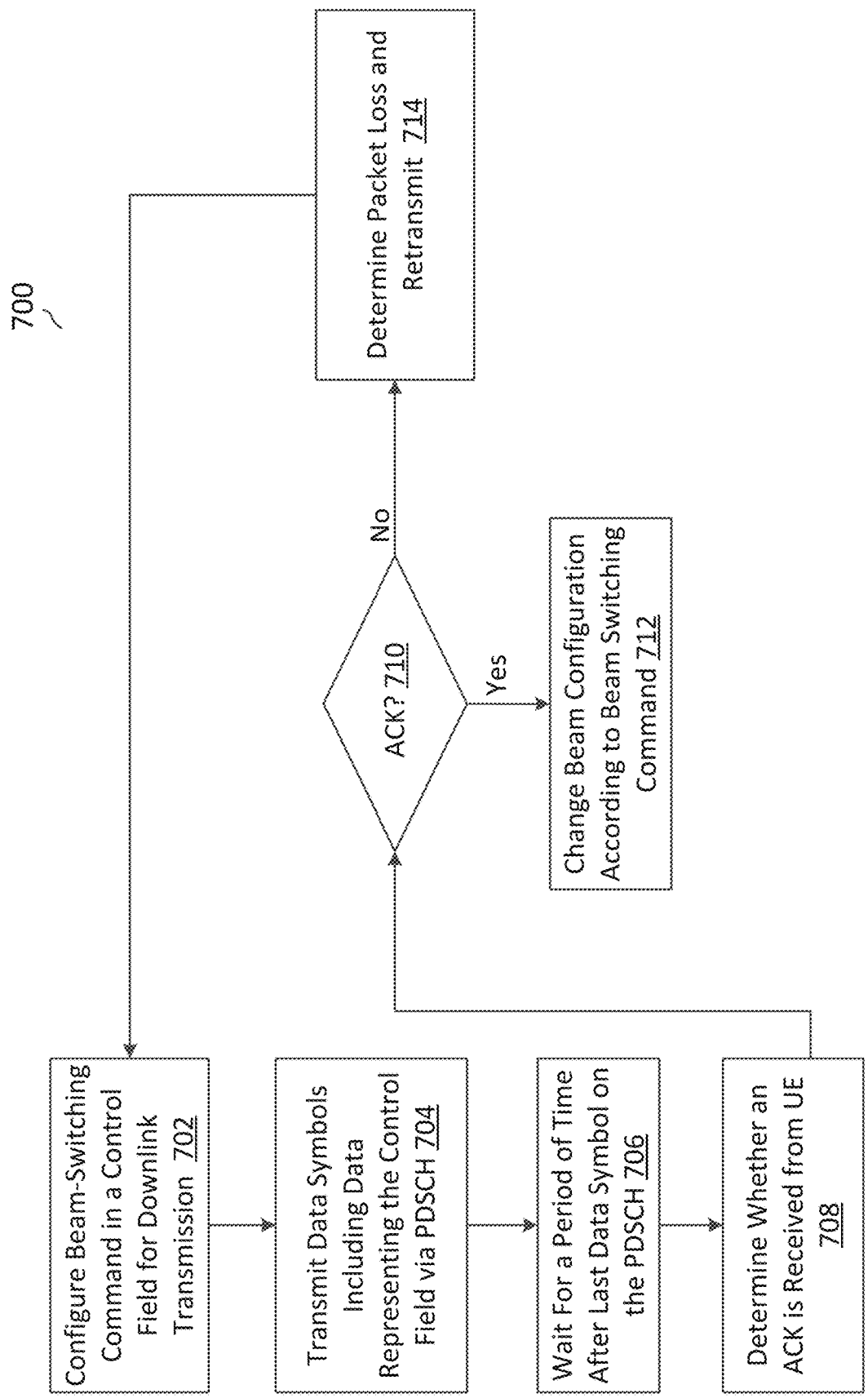
FIG. 7 illustrates an alternative logic flow performed by the BS implement the timeline for transmitting an acknowledgement with coverage enhancement for beam switching shown in FIG. 3B, according to some aspects of the present disclosure.

FIG. 7 illustrates an alternative logic flow performed by the BS implement the timeline for transmitting an ACK with coverage enhancement for beam switching shown in FIG. 3B, according to some aspects of the present disclosure. Steps of the method 700 can be executed by a computing device (e.g., a processor, processing circuit, and/or other suitable component) of a wireless communication device or other suitable means for performing the steps. For example, a wireless communication device, such as the BS 112, BS 204, BS 302 or BS 500, may utilize one or more components, such as the processor 502, the memory 504, the beam switching module 508, the communication interface 509, the transceiver 510, the modem 512, and the one or more antennas 516, to execute the steps of method 700. As illustrated, the method 700 includes a number of enumerated steps, but aspects of the method 700 include additional steps before, after, and in between the enumerated steps. In some aspects, one or more of the enumerated steps may be omitted or performed in a different order.

At step 702, the BS may configure a beam-switching command in a control element field in data for downlink transmission, e.g., in the MAC CE, UE-specific DCI, or group-common DCI, etc. AT step 704, the BS may then transmit the data symbols including the control field via a PDSCH transmission occasion, e.g., the downlink signal 356 in FIG. 3B.

At step 704, the BS may wait for a period of time after the last data symbol on the PDSCH transmission occasion is transmitted. For example, the waiting period of time may correspond to the additional period of time allowed at the UE to decode MAC CE. Specifically, in some embodiments, as discussed in relation to FIG. 3B, the period of time may be determined by the BS and sent to the UE via RRC signaling.

At step 708, the BS may determine whether an ACK is received from UE, after the waiting period of time. For example, the BS usually relies on the receipt of ACK to determine whether the previously transmitted data packet was received. During the waiting period of time at step 706, the BS refrains from determining a packet loss even no ACK is received. When the waiting period of time has lapsed, the BS may determine a packet loss if no ACK is received.

At decision step 710, if the ACK is received by the BS, the method 700 proceeds to step 712, at which the BS changes its beam configuration for downlink transmission according to the beam switching command.

At decision step 712, if no ACK is received by the BS, the method 700 proceeds to step 714, at which the BS may determine that a packet loss occurred and may retransmit the previously transmitted data symbols representing the lost packet. In this way, the BS may proceed to step 702 to re-configure the beam switching command in the control element of the retransmitted data and repeat steps 702-712.

In some embodiments, at decision step 710, the BS may further determine whether the ACK is received with coverage enhancement and may only proceed to step 712 to change its beam configuration when an ACK with coverage enhancement. For example, when a decoding error occurs at the UE side such that the UE fails to parse the beam switching command from MAC CE, UE-specific DCI or the group-common DCI, and only sends a regular ACK, the UE will not change its beam configuration. In this case, even if the BS receives a regular ACK, the BS does not proceed to step 712 to change its beam configuration. Instead, the BS may assume that the UE does not get the beam switching command, regardless of whether PDSCH data symbols were received. The BS may then configure the beam-switching command in the next downlink signal for transmission, before making any change to the beam configuration.

FIGS. 8A-D provide examples of coverage enhancements that the UE may utilize for transmitting an ACK to acknowledge a DL signal having a transmit beam change or beam switch signal from the base station. The various examples of coverage enhancement may be used by the UE 114 in FIG. 1, UE 202 in FIG. 2, UE 304 in FIGS. 3A-B, UE 400 in FIG. 4 to transmit an ACK with coverage enhancement as described in relation to FIG. 3B and FIG. 6.

Figure 8B:
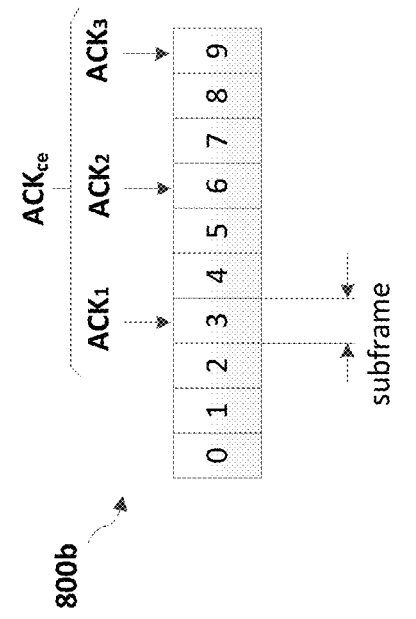
FIGS. 8A-D provide examples of coverage enhancements that the UE may utilize for transmitting an acknowledgment to acknowledge a downlink signal having a transmit beam change or beam switch signal from the base station, according to aspects of the present disclosure.
Figure 8A:
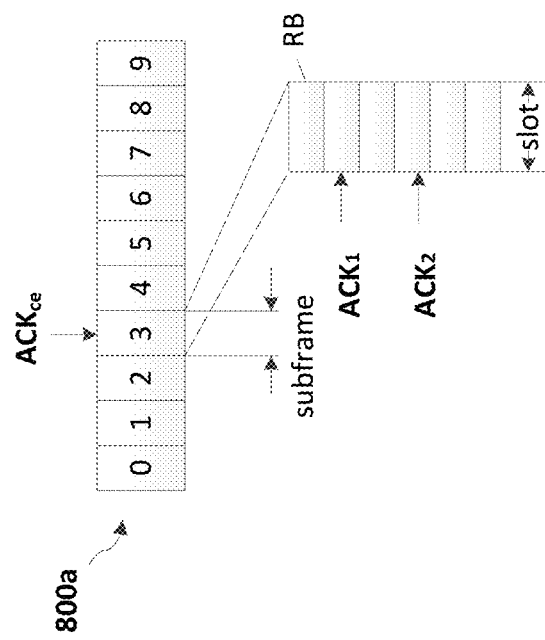
Figure 8D:
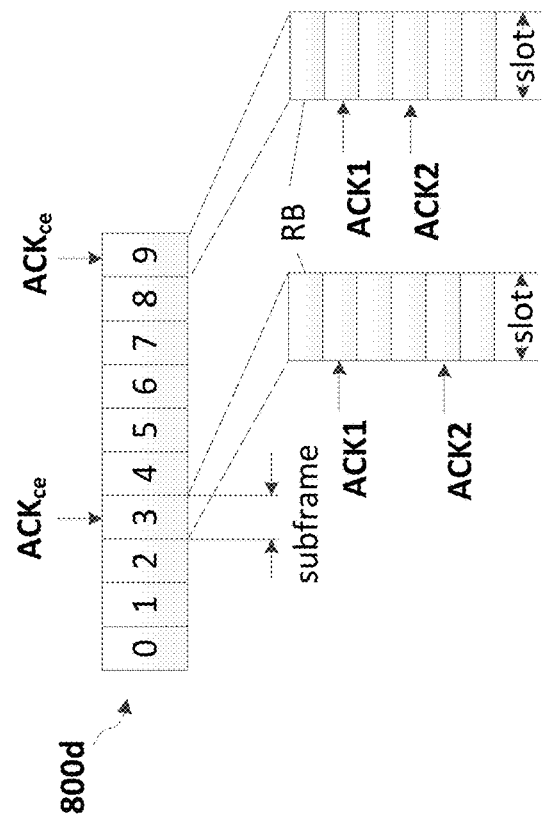
Figure 8C:
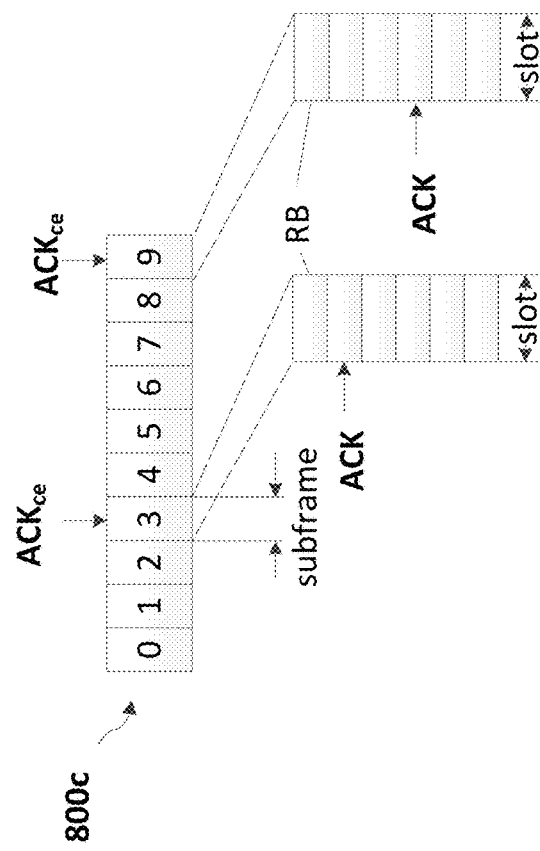

In FIG. 8A, the diagram 800a illustrates a coverage enhancement where the UE may be configured to transmit the ACK in additional time resources, e.g., expanded time resource as compared to an existing configured time resource within the PUCCH. As shown in the aspect of FIG. 8A, the ACK transmitted with the coverage enhancement (e.g., $ACK_{ce}$) may be transmitted in one or more resource blocks of a subframe (e.g., subframe 3), such that the ACK is transmitted concurrently in the same time slot using multiple resource blocks (more than previously configured) as shown. In the diagram 800b of FIG. 8B, the ACK with the coverage enhancement (e.g., $ACK_{ce}$) may be transmitted by the UE at different times, such that the ACK is transmitted in different subframes, e.g., the ACK is transmitted at subframes 3, 6, and 9 (more than previously configured). In the diagram 800c of FIG. 12C, the UE transmits the ACK repeatedly in different frequency resources, e.g., ACK is transmitted at different frequencies at subframe 3 and subframe 9, respectively. In the diagram 800d of FIG. 8D, the UE may send the ACK with the coverage enhancement, where the coverage enhancement includes a repeated transmission of the ACK at different frequency ranges or time instances. In the aspects of FIG. 8D, the ACK is transmitted using different frequencies in subframe 3 and may also be transmitted using different frequencies in subframe 9. Within each subframe, the ACK may be transmitted using multiple resource blocks. The aspects provided in FIGS. 8A-8D are examples and are not intended to be an exhaustive list of the coverage enhancements. The disclosure is not intended to be limited to the aspects provided herein.

Figure 9:
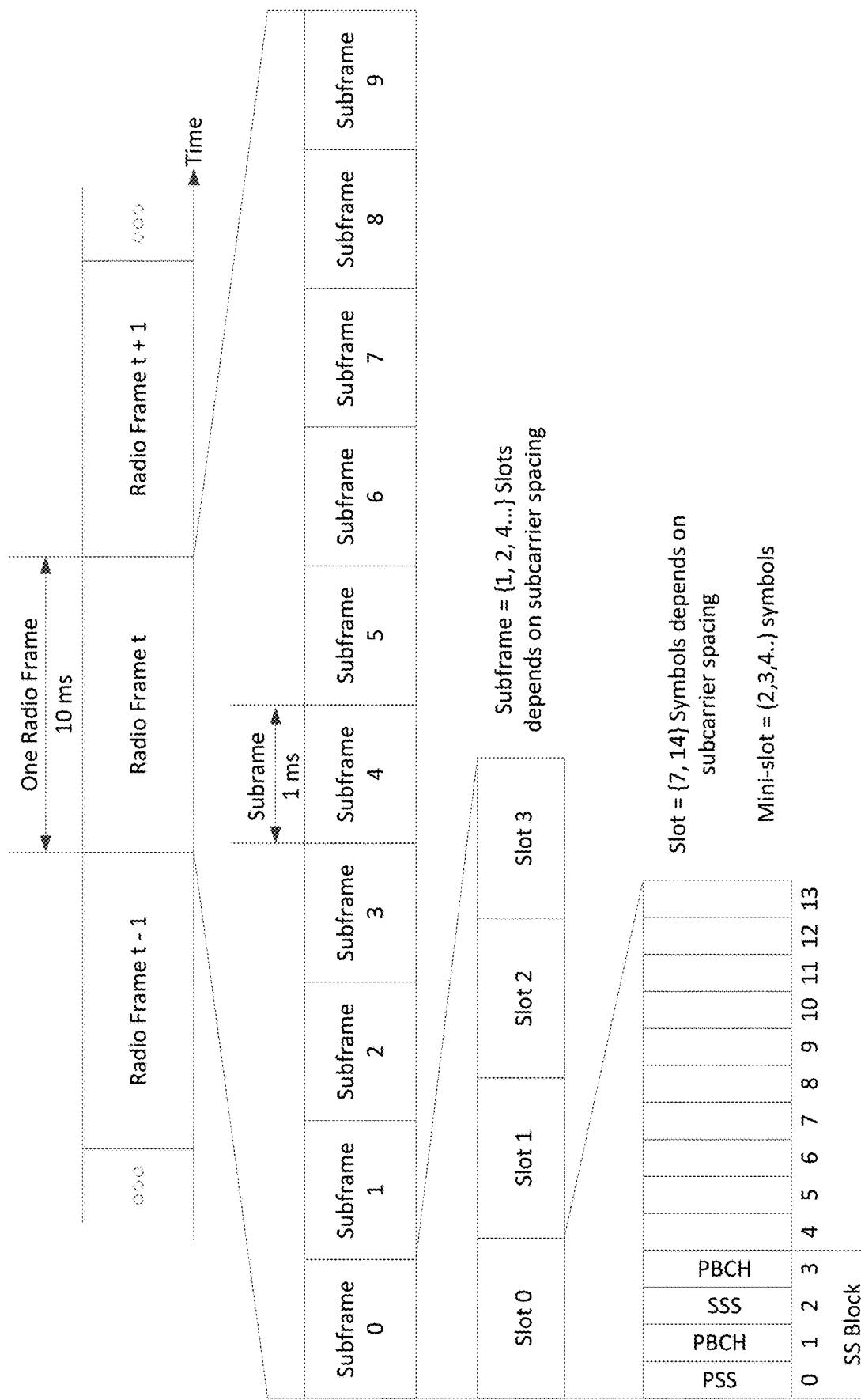
FIG. 9 is an example frame format for new radio (NR), in accordance with certain aspects of the present disclosure.

FIG. 9 is a diagram showing an example of a frame format for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In an example RAN, such as a 5G NR RAN, communication is achieved through beamforming in mmW and near-mmW systems. For beamforming, the base station and the UE may perform beam training in which the base station and the UE select beams on which to communicate. For example, the UE may identify one or more beams that are to be paired with one or more beams at the base station. Accordingly, when the base station transmits a downlink transmission using one beam of the base station, the UE may receive the downlink transmission using a corresponding beam of the UE, which may be paired with the beam used at the base station.

The base station may determine the best beam to use for communicating with the UE, such as a beam having the best channel quality, highest associated reference signal receive power (RSRP), highest associated signal-to-interference-plus-noise ratio (SINR), etc. The UE may then use a corresponding beam, identified to be paired with the best beam at the base station, to communicate with the base station. However, the best beam may change over time, such as when channel conditions change, blockers enter the beam path, and so forth. Therefore, the base station may determine a new best beam to use for communication with the UE going forward.

In order for the UE to communicate with the base station using the new best beam at the base station, the base station should inform the UE of the beam change. Based on receiving information indicating the beam change, the UE may determine a new corresponding beam at the UE that pairs well with the new best beam at the base station.

In some aspects, the base station may transmit information indicating the beam change on a downlink control channel, such as a PDCCH. For example, different bits of DCI carried on the downlink control channel may indicate the beam change, thereby allowing the UE to determine a new corresponding beam.

However, the base station should ensure that the UE has received the information indicating the beam change. Otherwise, the UE may be unable to communicate with the base station if the UE fails to switch to the new corresponding beam, e.g., due to the failure of the UE to successfully receive the information indicating the beam change. Therefore, the UE may be configured to transmit ACK feedback to the base station in response to receiving the information indicating the beam change.

In some scenarios, the base station may fail to receive ACK feedback transmitted by the UE, such as when the uplink beam used by the UE becomes blocked, the UE is nearly out of the coverage area of the base station, and so forth. Thus, a need exists to improve the reliability of acknowledging a beam change indication.

In certain aspects, various techniques and solutions are provided for improving the reliability of acknowledging a beam change indication, e.g., by transmitting the beam change indication on a downlink data channel, such as a physical downlink shared channel (PDSCH). For example, the base station may include the beam change indication in a medium access control (MAC) control element (CE) carried on the PDSCH. This beam change indication on the downlink data channel may be a repetition of another beam change indication carried on a downlink control channel (PDCCH). The UE may receive the beam change indication on the downlink data channel and, in response, may transmit separate (e.g., different) ACK feedback to the base station. Thus, reliability of acknowledging a beam change indication may be improved, e.g., as the UE may have at least two configuration for ACK feedback in response to a beam change indication.

Figure 10:
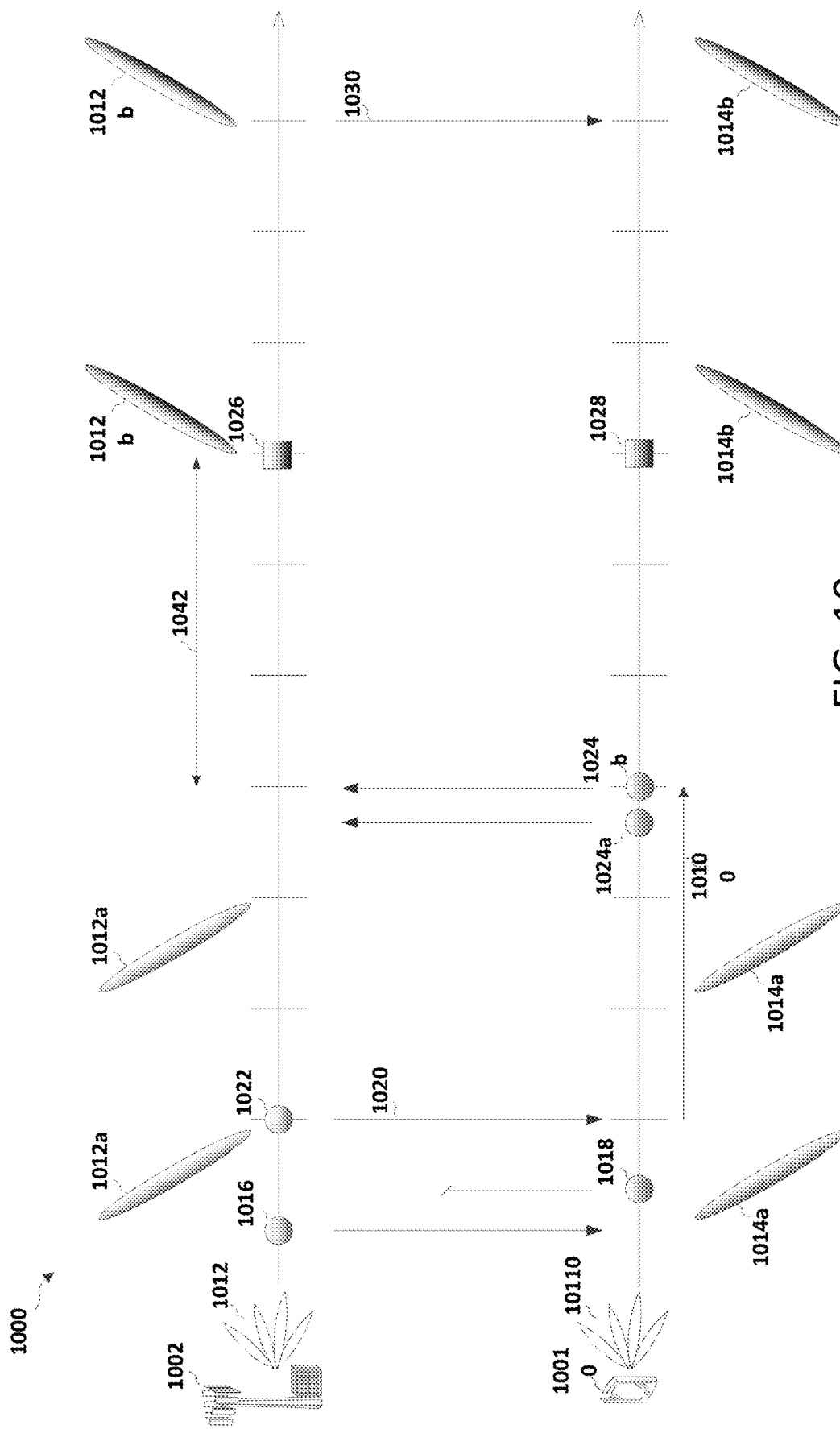
FIG. 10 is an example timing diagram for beam switching, in accordance with certain aspects of the present disclosure.

FIG. 10 is a diagram illustrating example operations over time in an access network 1000. In the access network 1000, a base station 1002 may be configured to communicate with a UE 1004 using beamforming in a mmW or near-mmW system. Accordingly, the base station 1002 may generate a set of beams 1012, which may be TX beams used to transmit signaling to the UE 1004. Similarly, the UE 1004 may be configured with a set of beams 1014, which may be RX beams used to receive signaling from the base station 1002.

In some aspects, the base station 1002 may configure a set of available beams for the UE 1004. For example, the base station 1002 may transmit a set of transmission configuration indication (TCI) states to the UE 1004, and each TCI state may correspond to a TX beam 1012 that the base station 1002 may use to transmit downlink signals to the UE 1004. The UE 1004 may pair at least one of the RX beams 1014 with each of the available beams indicated by the base station 1002, e.g., based on reference signals and/or SSBs respectively transmitted using one of the TX beams 1012 and received using one of the RX beams 1014.

The base station 1002 may select one of the TX beams 1012 as the "best" beam for communication with the UE 1004. For example, the base station 1002 may determine that a first TX beam 1012a is the best beam to be used to transmit to the UE 1004, e.g., based on channel state information (CSI) reporting and/or other feedback indicative of channel quality received from the UE 1004. The UE 1004 may use a corresponding first RX beam 1014*a* to receive signaling transmitted by the base station 1002 using the first TX beam 1012*a*—that is, the UE 1004 may pair the first RX beam 1014*a* with the first TX beam 1012*a*.

As conditions may change over time, the first TX beam 1012*a* may no longer be the best beam for communication with the UE 1004 at some point in the future. For example, the base station 1002 may receive CSI reporting and/or other channel quality feedback that indicates the channel conditions (e.g., RSRP, SINR, etc.) associated with the first TX beam 1012*a* are deteriorating. However, the base station 1002 may additionally receive CSI reporting and/or other channel quality feedback that indicates the channel conditions associated with a second TX beam 1012*b* are improving. Thus, the base station 1002 may determine that downlink communication with the UE 1004 should be switched to the second TX beam 1012*b*, e.g., as the first TX beam 1012*a* has become or is becoming the best beam.

In order to switch between the TX beams 1012 used by the base station 1002, the base station 1002 may inform the UE 1004 of the beam change to the second TX beam 1012*b*. Further, the UE 1004 may acknowledge the beam change to the base station 1002 so that the base station 1002 is aware that the UE 1004 will be able to receive downlink transmissions after the beam switch. Thus, the base station 1002 may be configured to transmit an indication of the beam change to the UE 1004 and, correspondingly, the UE 1004 may be configured to transmit ACK feedback that acknowledges the beam change.

In some aspects, the base station 1002 may transmit one beam change indication 1016 to the UE 1004 on a downlink control channel (e.g., PDCCH), such as in reserved bits of DCI. The UE 1004 may receive the beam change indication 1016 or, potentially, may fail to receive the beam change indication 1016 on the downlink control channel. When the UE 1004 does receive the beam change indication 1016 on the downlink control channel, the UE 1004 may transmit ACK feedback 1018 to the base station 1002 in response to the beam change indication 1016. For example, the UE 1004 may transmit the ACK feedback 1018 on an uplink control channel, such as a PUCCH.

However, the base station 1002 may fail to receive the ACK feedback 1018 responsive to the beam change indication 1016 on the downlink control channel, e.g., due to poor channel conditions, blockers in the beam path, the UE 1004 being nearly out of coverage, etc. Thus, the base station 1002 may also be configured to transmit a beam change indication on a downlink data channel, such as a PDSCH. In some aspects, the beam change indication on the downlink data channel may be the same as the beam change indication 1016 on the downlink control channel—that is, both beam change indications may indicate the same beam to which the base station 1002 intends to switch.

In some aspects, the UE 1004 may not always expect to receive a beam change indication on the downlink data channel. Therefore, the UE 1004 may be configured with a set of parameters and/or the beam change on the downlink data channel may be activated at the UE 1004. For example, the UE 1004 may determine a set of parameters associated with a beam change indication on the downlink data channel and/or associated with acknowledging a beam change indication on the downlink data channel.

In some aspects, the UE 1004 may determine the set of parameters based on information that is preconfigured at the UE 1004. For example, the set of parameters may be stored in memory of the UE 1004 according to one or more standards and/or specifications set by one or more standards organizations (e.g., 3GPP). In some other aspects, the UE 1004 may determine the set of parameters based on information received from the base station 1002. That is, the base station 1002 may transmit information indicating the set of parameters to the UE 1004, which may configure the UE 1004 to receive and/or acknowledge a beam change indication on the downlink data channel.

By way of example, the set of parameters may indicate a configuration associated with repeated transmissions of ACK feedback responsive to receiving a beam change indication on the downlink data channel, such as a number of times the UE 1004 is to transmit ACK feedback responsive to receiving a beam change indication on the downlink data channel. In another example, the set of parameters may indicate a set of resource on an uplink channel (e.g., PUCCH) on which the UE 1004 is to transmit ACK feedback responsive to a beam change indication carried on the downlink data channel. In a further example, the set of parameters may indicate a format of an uplink control channel (e.g., PUCCH) on which the UE 1004 is to transmit ACK feedback responsive to a beam change indication carried on the downlink data channel.

In addition, the UE 1004 may determine that a beam change indication carried on the downlink data channel is active, and based thereon, the UE 1004 may identify the beam change indication and respond accordingly. In some aspects, the base station 1002 may transmit information activating the beam change indication on the downlink data channel to the UE 1004. Thus, when the UE 1004 receives such information from the base station 1002, the UE 1004 may be configured to identify the beam change indication and respond accordingly.

In the example access network 1000, the beam change indication on the downlink data channel may be activated for the UE 1004. Thus, when the base station 1002 determines that the TX beam used for communication with the UE 1004 should be switched from the first TX beam 1012*a* to the second TX beam 1012*b*, the base station 1002 may generate a beam change indication 1022, which may indicate the switch to the second TX beam 1012*b*. For example, the beam change indication 1022 may include information identifying the second TX beam 1012*b*, such as a TCI state corresponding to the second TX beam 1012*b*.

According to various aspects, the base station 1002 may include the beam change indication 1022 in a MAC control element (CE). The base station 1002 may transmit a downlink transmission 1020 to the UE 1004 on the downlink data channel using the first TX beam 1012*a*, and the downlink transmission 1020 may include data and the MAC CE including the beam change indication 1022.

The UE 1004 may receive the downlink transmission 1020 on the downlink data channel using the first RX beam 1014*a*. Thus, the UE 1004 may decode the data in the downlink transmission 1020 and, further, may decode the beam change indication 1022 included (in the MAC CE) on the downlink data channel. The UE 1004 may then generate first ACK feedback 1024*a* responsive to the data and may generate second ACK feedback 1024*b* responsive to the beam change indication 1022. For example, the UE 1004 may generate information indicating a respective hybrid automatic repeat request (HARQ) ACK when the UE 1004 successfully decodes the data and the beam change indication 1022, or the UE 1004 may generate a respective HARQ negative ACK (NACK) when the UE 1004 fails to successfully decode the data and the beam change indication 1022.

Thus, in some aspects, each of the first and second ACK feedback 1024*a-b* may indicate either an ACK or a NACK, depending upon whether the data and the beam change indication 1022, respectively, is successfully decoded.

The UE 1004 may subsequently transmit the first ACK feedback 1024*a* to the base station 1002 in response to receiving the data in the downlink transmission 1020 on the downlink data channel. Further, the UE 1004 may transmit the second ACK feedback 1024*b* to the base station 1002 in response to receiving the beam change indication 1022 in the downlink transmission 1020 on the downlink data channel. According to various aspects, the second ACK feedback 1024*b* may be separate from the first ACK feedback 1024*a*.

In one example, the second ACK feedback 1024*b* may be separate from the first ACK feedback 1024*a* in that the second ACK feedback 1024*b* may be transmitted on a second set of resources that is different from a first set of resources on which the first ACK feedback 1024*a* is transmitted. In another example, the second ACK feedback 1024*b* may be separate from the first ACK feedback 1024*a* in that the second ACK feedback 1024*b* may be transmitted in a second format (e.g., PUCCH format) that is different from a first format in which the first ACK feedback 1024*a* is transmitted.

In a further example, the second ACK feedback 1024*b* may be separate from the first ACK feedback 1024*a* in that the second ACK feedback 1024*b* may be transmitted as a second type that is different from a first type as the first ACK feedback 1024*a* is transmitted. Illustratively, the type with which the first and/or second ACK feedback 1024*a-b* may be transmitted may include a set of sequences and/or mapping that may be associated with the uplink control channel (e.g., associated with the PUCCH and/or a format of the PUCCH) on which the first and/or second ACK feedback 1024*a-b* may be transmitted.

In still another example, the second ACK feedback 1024*b* may be separate from the first ACK feedback 1024*a* in that the second ACK feedback 1024*b* may be transmitted using a second transmission method different from a first transmission method used for transmitting the first ACK feedback 1024*a*. Illustratively, the transmission method may refer to transmission of the first ACK feedback 1024*a* and/or second ACK feedback 1024*b* with or without repetition. In some aspects, the transmission method may refer to application of beam diversity (e.g., by using different beams) for transmission of the first ACK feedback 1024*a* and/or second ACK feedback 1024*b*, such as application of beam diversity to different repetitions of the second ACK feedback 1024*b*. In some other aspects, the transmission method may refer to application of frequency diversity for transmission of the first ACK feedback 1024*a* and/or second ACK feedback 1024*b*, such as by using frequency hopping on repetitions of transmissions of the first ACK feedback 1024*a* and/or the second ACK feedback 1024*b*.

Responsive to receiving the beam change indication 1022 (and/or the beam change indication 1016 on the downlink control channel), the UE 1004 may be configured to switch 1028 to another one of the beams 1014 that corresponds to the beam indicated by the beam change indication 1022. For example, the UE 1004 may identify the one of the beams 1014 that corresponds (e.g., is paired with) the one of the beams 1012 indicated by the beam change indication 1022, such as by determining an index of one of the beams 1014 that corresponds to a TCI state of one of the beams 1012 indicated by the beam change indication 1022. Illustratively, the UE 1004 may determine that the second RX beam 1014*b* corresponds to the second TX beam 1012*b* that is identified in the beam change indication 1022. The UE 1004 may then switch to the second RX beam 1014*b* in order to begin receiving downlink transmissions from the base station 1002 using the second TX beam 1012*b*.

In some aspects, the UE 1004 may transmit a plurality of repetitions of the second ACK feedback 1024*b*. Potentially, the UE 1004 may transmit one or more repetitions of the second ACK feedback 1024*b* by applying one of beam diversity (e.g., transmitting different repetitions using different TX beams of the UE 1004) and/or frequency diversity (e.g., frequency hopping among repetitions of the second ACK feedback 1024*b*). The UE 1004 may determine the number of repetitions (as well as other information, such as beam diversity and/or frequency diversity) for transmission of the second ACK feedback 1024*b* based on the determined set of parameters.

In some aspects, the UE 1004 may delay transmission of at least the second ACK feedback 1024*b*, e.g., by a delay period 1040. In so doing, the UE 1004 may be allotted a sufficient time duration 1042 to switch 1028 to the second RX beam 1014*b*. In some aspects, the base station 1002 may transmit information indicating the delay period 1040 to the UE 1004. In some other aspects, the delay period 1040 may be preconfigured at the UE 1004—e.g., the delay period 1040 may be stored in memory of the UE 1004 according to one or more standards and/or specifications set by one or more standards organizations (e.g., 3GPP). The UE 1004 may initiate a timer for the delay period 1040 at the end of the downlink transmission 1020 (e.g., when no more resources are carrying data for the UE 1004 on the downlink data channel), and the UE 1004 may then transmit at least the second ACK feedback 1024*b* after the timer reaches the delay period 1040 or the timer set to the delay period 1040 elapses.

Correspondingly, the base station 1002 may receive the first ACK feedback 1024*a* responsive to the data of the downlink transmission 1020 and the second ACK feedback 1024*b* responsive to the beam change indication 1022 (included in the MAC CE) of the downlink transmission 1020 on the downlink data channel. The base station 1002 may switch 1026 to the second TX beam 1012*b* in response to receiving the second ACK feedback 1024*b*. As the UE 1004 may delay transmission of the second ACK feedback 1024*b* for the delay period 1040, the base station 1002 may be configured to refrain from switching to the second TX beam 1012*b* until after the second ACK feedback 1024*b* is received following the delay period 1040.

After the base station 1002 switches 1026 to the second TX beam 1012*b* and the UE 1004 switches 1028 to the second RX beam 1014*b*, the base station 1002 may use the second TX beam 1012*b* as the "current" beam and/or the "control" beam. For example, the base station 1002 may transmit another downlink transmission 1030 to the UE 1004 using the second TX beam 1012*b*, and the UE 1004 may receive the other downlink transmission 1030 using the second RX beam 1014*b*.

As described herein, in mmW systems, transmissions may be beamformed as beamforming mitigates high path loss at higher frequencies. The best transmit beam may change from time to time, and the BS may inform the UE through physical downlink control channel (PDCCH) whether the BS will change transmit beam. Different bits may be reserved in downlink control information (DCI) to convey this information. The UE may change a corresponding RX beam accordingly.

In some cases, the BS may ensure that the UE has received beam change instruction. For example, the BS may control the beam switch via medium access control (MAC)-control element (CE) or DCI, and the BS may switch the control beam after reception of an acknowledgement (ACK) from the UE. The set of possible beams (TCI states) in NR may be configured via radio resource control (RRC), and MAC-CE or DCI may select one of the beams to be active for communication. The ACK from the UE provides the BS the confirmation to switch to a new beam, as described with respect to FIG. 10. In some cases, the uplink (UL) beam used to transmit the ACK may be blocked or may have insufficient coverage such that the ACK signal is not received by the BS. In some aspects, coverage enhancement may be applied for the beam-change ACK by applying repetition to the ACK for a physical downlink shared channel (PDSCH) containing the beam-change MAC CE, as described with respect to FIG. 10.

In certain aspects of the present disclosure, different timing parameters may be configured for the beam-switching to take effect, depending on whether an ACK feedback contains acknowledgement of a beam-switching MAC CE or not. For example, in case of receiving ACK with indication of MAC-CE parsing (e.g., whether MAC-CE was parsed successfully), the wait time after ACK for beam switching may be less than a case where the ACK is without MAC-CE parsing (e.g., the ACK only indicates whether the PDSCH containing the beam-change MAC-CE is decoded successfully). As such, the latency for beam switching may be reduced, making beam management occur faster to reduce the duration of time that the UE and BS are configured on a relatively weak beam.

Figure 11:
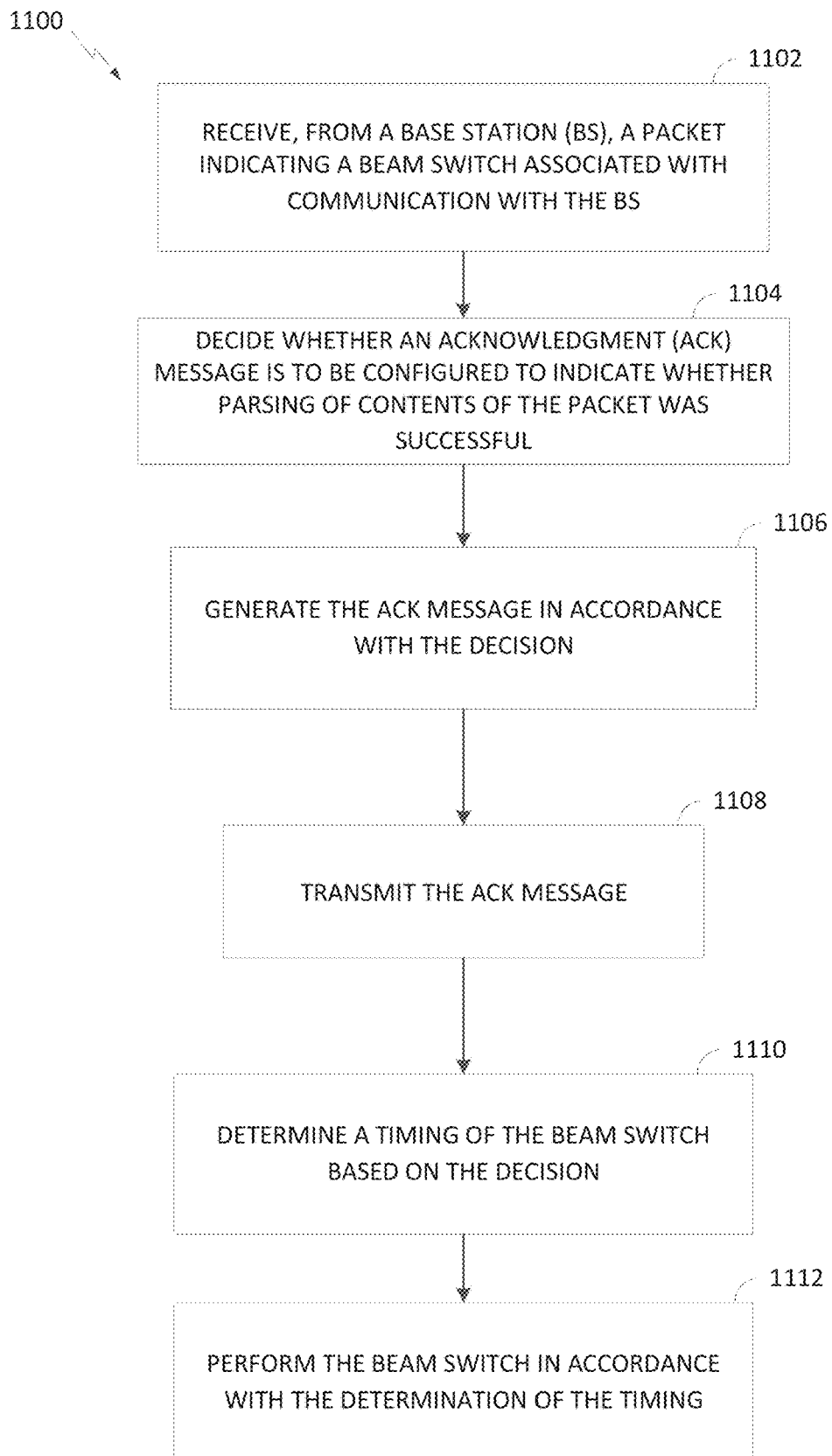
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by UE (e.g., such as a UE 115a-d in the wireless communication network 100).

The operations 1100 may be complimentary operations by the UE to operations 1200 performed by the BS. Operations 1100 may be implemented as software components that are executed and run on one or more processors (e.g., processor 502 of FIG. 5). Further, the transmission and reception of signals by the UE in operations 1100 may be enabled, for example, by one or more antennas (e.g., antennas 516 of FIG. 5). In certain aspects, the transmission and/or reception of signals by the UE may be implemented via a bus interface of one or more processors (e.g., processor 402) obtaining and/or outputting signals.

The operations 1100 may begin, at block 1102, by the UE receiving, from a BS, a packet indicating a beam switch associated with communication with the BS. At block 1104, the UE decides whether an ACK message is to be configured to indicate whether parsing of contents of the packet was successful, and at block 1106, generates the ACK message in accordance with the decision. At block 1108, the UE transmits the ACK message, at block 1110, determines a timing of the beam switch based on the decision, and at block 1112, performs the beam switch in accordance with the determination of the timing.

Figure 12:
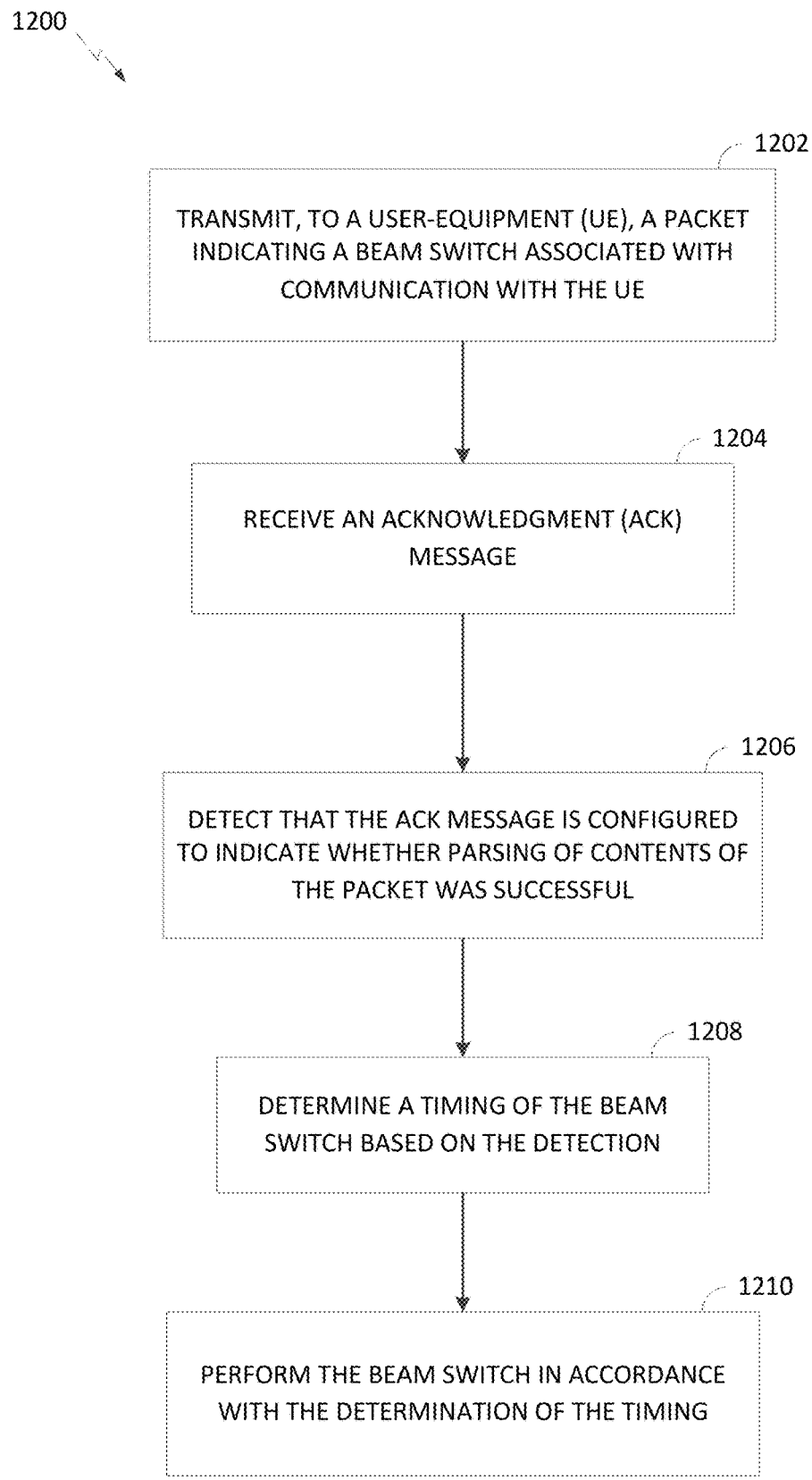
FIG. 12 is a flow diagram illustrating example operations for wireless communication by a BS, in accordance with certain aspects of the present disclosure.

FIG. 12 is a flow diagram illustrating example operations 1200 for wireless communication, in accordance with certain aspects of the present disclosure. The operations 1200 may be performed, for example, by a BS (e.g., such as the BS 105a-e in the wireless communication network 100).

The operations 1200 may be complimentary operations by the BS to operations 1100 performed by the UE. Operations 1200 may be implemented as software components that are executed and run on one or more processors. Further, the transmission and reception of signals by the BS in operations 1200 may be enabled, for example, by one or more antennas (e.g., antennas 416 of FIG. 4). In certain aspects, the transmission and/or reception of signals by the BS may be implemented via a bus interface of one or more processors (e.g., processor 502) obtaining and/or outputting signals.

The operations 1200 may begin, at block 1202, by the BS transmitting, to a UE, a packet (e.g., including beam change indication 416) indicating a beam switch associated with communication with the UE. At block 1204, the BS receives an acknowledgment (ACK) message (e.g., the ACK feedback 1024b). At block 1206, the BS detects that the ACK message is configured to indicate whether parsing of contents (e.g., MAC-CE including beam change indication 1016) of the packet was successful (e.g., detects whether the ACK message is with or without MAC-CE parsing). In some examples, the detection that the ACK message is configured to indicate whether parsing of the contents of the packet was successful may be based on one or more bits of the ACK message, based on resources used to receive the ACK message, or based on a reception time of the ACK message, as described in more detail herein. For example, the detection that the ACK message is configured to indicate whether parsing of the contents of the packet was successful may be based on a delay parameter (e.g., k1 parameter) associated with a delay (e.g., the delay period 1040) between the transmission of the packet and reception of the ACK message.

At block 1208, the BS determines a timing of the beam switch based on the detection. In some examples, determining the timing of the beam switch is done by determining to defer the beam switch by a first duration of time (e.g., time duration 1042 between ACK feedback 1024b and switch 1026 of the TX beam) if the ACK message is configured to indicate whether parsing of the message was successful (e.g., the ACK message is with MAC-CE parsing). In certain aspects, determining the timing of the beam switch is done by determining to defer the beam switch by a second duration of time if the ACK message is not configured to indicate whether parsing of the message was successful (e.g., the ACK message is without MAC-CE parsing), the first duration of time being less than the second duration of time. In certain aspects, the timing of the beam switch may be further determined based on a frequency range, band, subcarrier spacing configured for the communication with the UE. In some cases, the timing of the beam switch may be further determined based on a capability of the UE.

At block 1210, the BS performs the beam switch (e.g., the switch 1026) in accordance with the determination of the timing. In certain aspects, the BS configures the UE with the delay parameter to be used by the UE to specify, to the base station, that the ACK message is configured to indicate whether parsing of the contents of the packet was successful (e.g., whether the ACK is with MAC-CE parsing).

In certain aspects, the BS determines the delay parameter based on a frequency range, band, or subcarrier spacing configured for the communication with the UE. In certain aspects, the BS configures the UE with the timing of the beam switch to be used if the ACK message is configured to indicate whether parsing of contents of the packet was successful.

As used herein, an ACK message that is configured to indicate whether parsing of contents (e.g., MAC-CE) of a packet is successful may be referred to as an ACK with MAC-CE parsing. For example, an ACK with and without MAC-CE parsing may be differentiated via an ACK codebook. In some cases, ACK with and without MAC CE parsing may be differentiated based on using different physical uplink control channel (PUCCH) resources (e.g. different RB allocation). In some cases, ACK with and without MAC CE parsing may be differentiated implicitly based on a delay parameter (k1), k1 being the delay between the end of the PDSCH including MAC-CE and the ACK feedback. For example, a k1 greater than a certain threshold may implicitly considered as including MAC-CE parsing. In some cases, the threshold may be set in a standard specification or configured by the BS. In certain aspects, the threshold may depend on frequency range, band, subcarrier spacing, or any combination thereof.

In certain aspects, the timeline for the effective time of beam-switching, depending on receiving ACK with or without MAC CE parsing, may be indicated as fixed values in a standard specification. In some aspects, the timeline for effective time of beam-switching, depending on receiving ACK with or without MAC CE parsing, may be configured by the BS. In certain aspects, the timeline for effective time of beam-switching, depending on receiving ACK with or without MAC CE parsing, may be dependent on frequency range, subcarrier spacing, UE capability, or any combination thereof, as described herein.

Figure 13:
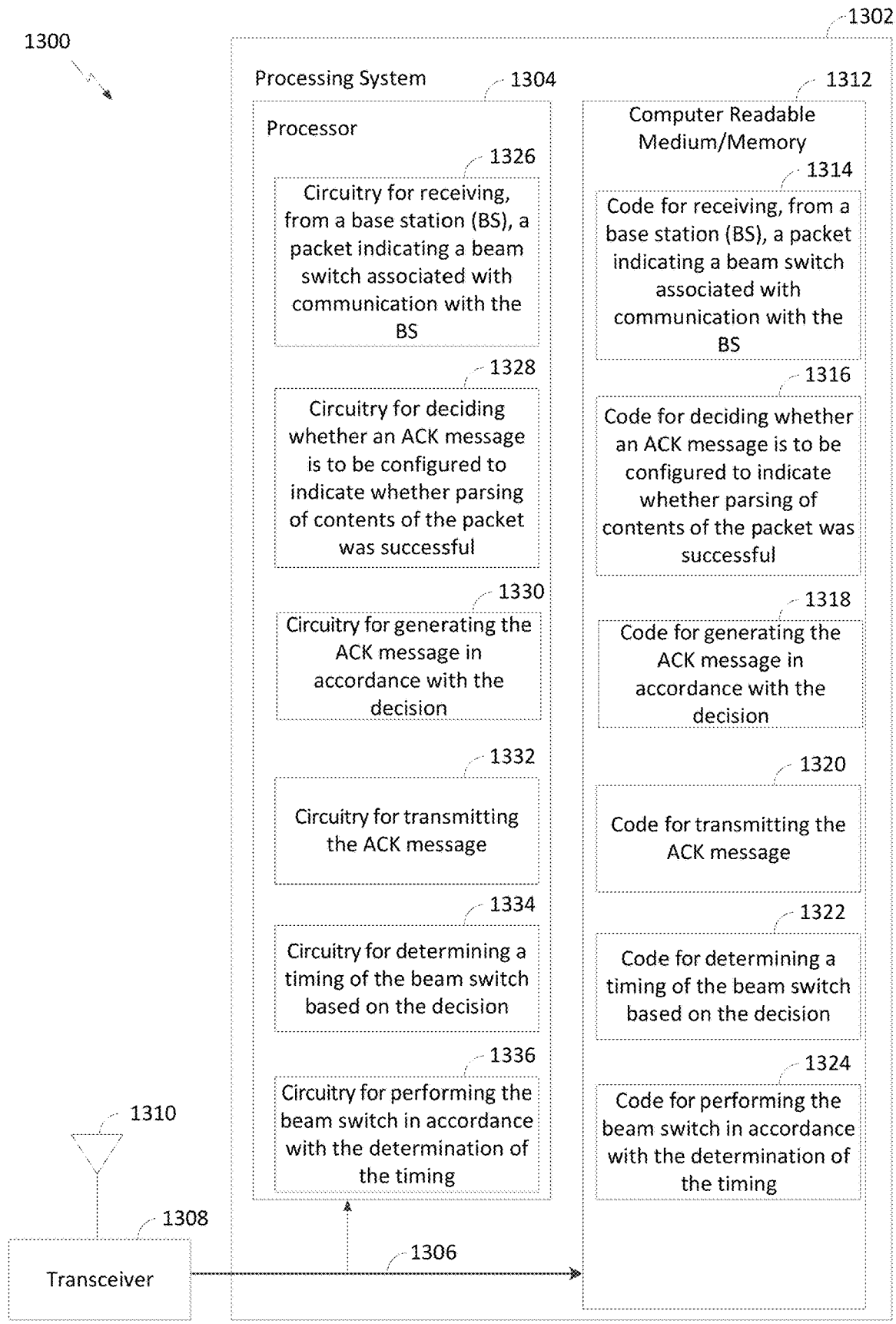
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 5. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 5, or other operations for performing the various techniques discussed herein for beam switching. In certain aspects, computer-readable medium/memory 1312 stores code 1314 for receiving, from a base station (BS), a packet indicating a beam switch associated with communication with the BS; code 1316 for deciding whether an acknowledgment (ACK) message is to be configured to indicate whether parsing of contents of the packet was successful; code 1318 for generating the ACK message in accordance with the decision; code 1320 for transmitting the ACK message; code 1322 for determining a timing of the beam switch based on the decision; and code 1324 for performing the beam switch in accordance with the determination of the timing. In certain aspects, the processor 1304 has circuitry configured to implement the code stored in the computer-readable medium/memory 1312. The processor 1304 includes circuitry 1326 for receiving, from a base station (BS), a packet indicating a beam switch associated with communication with the BS; circuitry 1328 for deciding whether an acknowledgment (ACK) message is to be configured to indicate whether parsing of contents of the packet was successful; circuitry 1330 for generating the ACK message in accordance with the decision; circuitry 1332 for transmitting the ACK message; circuitry 1334 for determining a timing of the beam switch based on the decision; and circuitry 1336 for performing the beam switch in accordance with the determination of the timing.

Figure 14:
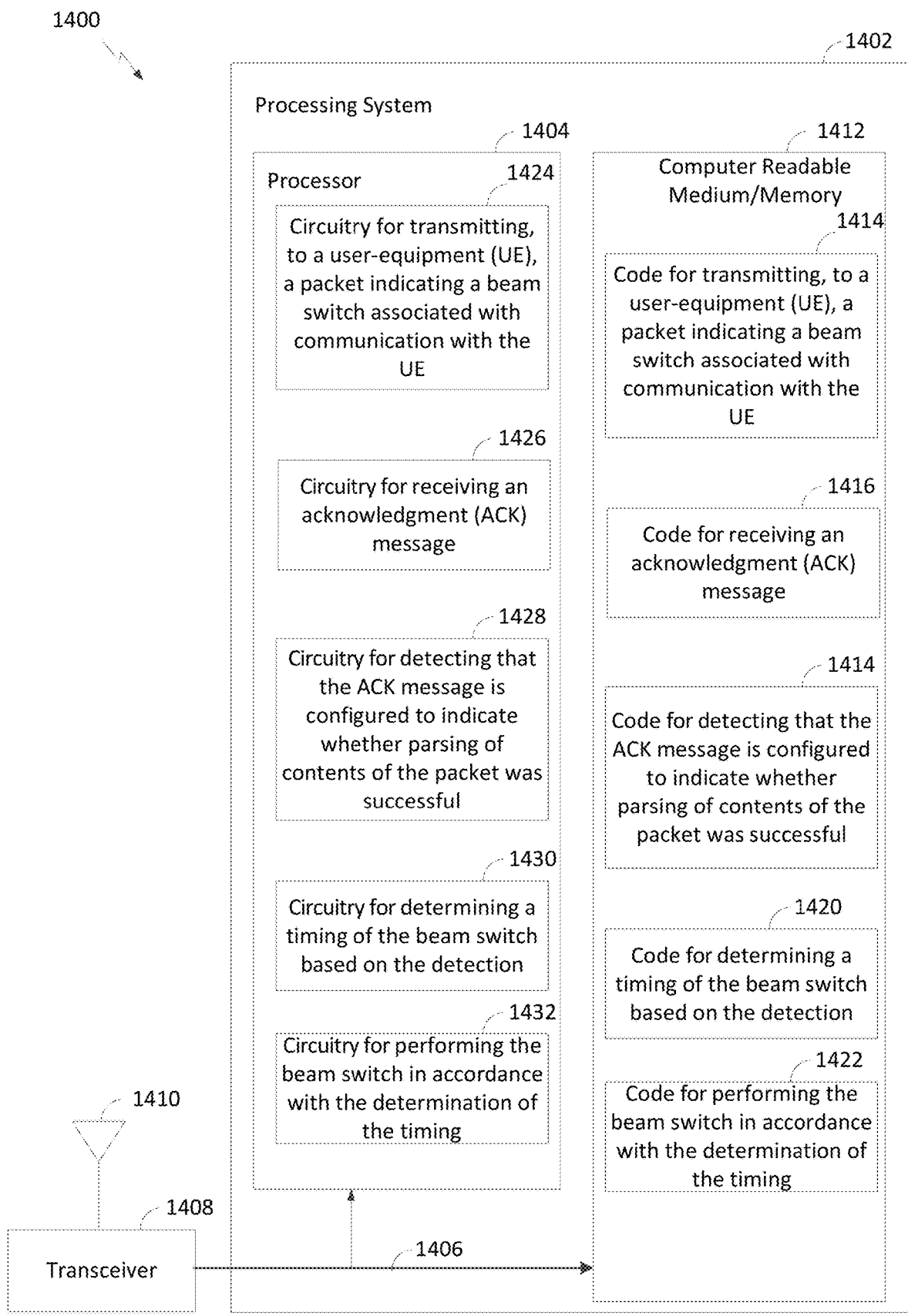
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 12. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 12, or other operations for performing the various techniques discussed herein for beam switching. In certain aspects, computer-readable medium/memory 1412 stores code 1414 for transmitting, to a user-equipment (UE), a packet indicating a beam switch associated with communication with the UE; code 1416 for receiving an acknowledgment (ACK) message; code 1418 for detecting that the ACK message is configured to indicate whether parsing of contents of the packet was successful; code 1420 for determining a timing of the beam switch based on the detection; and code 1422 for performing the beam switch in accordance with the determination of the timing.

In certain aspects, the processor 1404 has circuitry configured to implement the code stored in the computer-readable medium/memory 1412. The processor 1404 includes circuitry 1424 for transmitting, to a user-equipment (UE), a packet indicating a beam switch associated with communication with the UE; circuitry 1426 for receiving an acknowledgment (ACK) message; circuitry 1428 for detecting that the ACK message is configured to indicate whether parsing of contents of the packet was successful; circuitry 1430 for determining a timing of the beam switch based on the detection; and circuitry 1432 for performing the beam switch in accordance with the determination of the timing.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 1402.11 (Wi-Fi), IEEE 1402.16 (WiMAX), IEEE 1402.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11 and/or FIG. 12.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method for wireless communication by a base station, comprising:
    transmitting, to a user-equipment (UE), a packet indicating a beam switch associated with communication with the UE;
    receiving an acknowledgment (ACK) message after a pre-configured period of time after a last data symbol of the packet is transmitted;
    detecting that the ACK message is configured to indicate whether parsing of contents of the packet was successful;
    determining a timing of the beam switch based on the detection; and
    performing the beam switch in accordance with the determination of the timing after receiving the ACK message.

2. The method of claim 1, wherein the contents of the message comprise a medium access control (MAC)-control element (CE) in the message.

3. The method of claim 2, wherein determining the timing of the beam switch comprises determining to defer the beam switch by a first duration of time if the ACK message is configured to indicate whether parsing of the message was successful.

4. The method of claim 3, determining the timing of the beam switch comprises determining to defer the beam switch by a second duration of time if the ACK message is not configured to indicate whether parsing of the message was successful, the first duration of time being less than the second duration of time.

5. The method of claim 4, wherein the detection that the ACK message is configured to indicate whether parsing of the contents of the packet was successful is based on one or more bits of the ACK message.

6. The method of claim 4, wherein the detection that the ACK message is configured to indicate whether parsing of the contents of the packet was successful is based on resources used to receive the ACK message.

7. The method of claim 4, wherein the detection that the ACK message is configured to indicate whether parsing of the contents of the packet was successful is based on a reception time of the ACK message.

8. The method of claim 4, wherein the detection that the ACK message is configured to indicate whether parsing of the contents of the packet was successful is based on delay parameter associated with a delay between the transmission of the packet and reception of the ACK message.

9. The method of claim 8, further comprising configuration the UE with the delay parameter to be used by the UE to specify, to the base station, that the ACK message is configured to indicate whether parsing of the contents of the packet was successful.

10. The method of claim 8, further comprising determining the delay parameter based on a frequency range, band, or subcarrier spacing configured for the communication with the UE.

11. A user equipment (UE) of wireless communication, comprising:
    a transceiver that receives, from a base station (BS), data symbols via a physical downlink shared channel (PDSCH) transmission occasion, and refrains from transmitting an acknowledgement message to the BS for a pre-configured period of time after a last data symbol is received via the PDSCH transmission occasion prior to performing a beam switch; and a processor that parses a control element field from the received data symbols during the pre-configured period of time, and determines whether the control element filed contains a beam-switching command from the BS;

wherein the transceiver transmits, from the UE to the BS, an acknowledgement message indicating that the beam-switching command was successfully decoded with coverage enhancement in response to determining that the control element field contains the beam-switching command.

12. The UE of claim 11, wherein the control element field includes any of:
a control element field of a medium access control (MAC) message;
a UE-specific downlink control information (DCI) field; and
a group-common DCI field.

13. The UE of claim 11, wherein the pre-configured period of time is defined in a form of a plurality of milliseconds or a plurality of symbol times.

14. The UE of claim 11, wherein the processor further:
configures the pre-configured period of time based on a processing capability of the UE, wherein the configured period of time allows sufficient time for the UE to parse the control element field of the MAC message prior to receiving the data symbols via the PDSCH.

15. The UE of claim 11, wherein the pre-configured period of time is a pre-configured parameter defined in a wireless communication protocol, and the method comprises:
retrieving, by the UE, the pre-configured parameter for the period of time specified in the wireless communication protocol.

16. The UE of claim 11, wherein the pre-configured period of time is determined by the BS, and the method further comprises:
obtaining, by the UE, an indication for the period of time via radio resource control (RRC) signaling or downlink control information (DCI) from the BS.

17. The UE of claim 11, wherein the pre-configured period of time is determined based on any combination of a frequency range and a subcarrier spacing of the wireless communication between the BS and the UE.

18. The UE of claim 11, wherein the transceiver further:
transmits, from the UE to the BS, the acknowledgement message using an existing coverage configuration without coverage enhancement in response to determining that the control element field of the MAC message contains no beam-switching command.

19. The UE of claim 11, wherein the transceiver transmits the acknowledgement message with coverage enhancement including any one or combination of:
transmitting the acknowledgement message in expanded time or frequency resources than a previously configured time or frequency resource within a physical uplink control channel (PUCCH) transmission occasion; and
repeating the transmission of the acknowledgement message at different frequency ranges or time instances within the PUCCH transmission occasion.

20. The UE of claim 11, wherein the processor further:
changes a beam configuration according to the beam-switching command after transmitting the acknowledgement message with coverage enhancement.

21. A method of wireless communication, comprising:
configuring, by a base station (BS), a beam-switching command in a control element field in data for downlink transmission;
transmitting, by the BS to a user equipment (UE), data symbols including the data representing the control element field via a physical downlink shared channel (PDSCH) transmission occasion;
waiting, by the BS, for a pre-configured period of time after a last data symbol on the PDSCH transmission occasion is transmitted;
determining whether an acknowledgement message indicating the beam-switching command was successfully decoded is received from the UE after the pre-configured period of time; and
changing, by the BS, a beam configuration for downlink transmission in response to receiving the acknowledgement message after the pre-configured period of time.

22. The method of claim 21, wherein the control element field includes any of:
a control element field of a medium access control (MAC) message;
a UE-specific downlink control information (DCI) field; and
a group-common DCI field.

23. The method of claim 21, wherein the pre-configured period of time is defined in a form of a plurality of milliseconds or a plurality of symbol times.

24. The method of claim 21, further comprising:
receiving, from the UE, an indication of the period of time determined based on a processing capability of the UE, wherein the pre-configured period of time allows sufficient time for the UE to parse the control element field of the MAC message.

25. The method of claim 21, wherein the pre-configured period of time is a pre-configured parameter defined in a wireless communication protocol, and the method comprises:
retrieving, by the BS, the pre-configured parameter for the period of time specified in the wireless communication protocol.

26. A base station (BS) of wireless communication, comprising:
a processor that configures a beam-switching command in a control element field in data for downlink transmission;
a transceiver that transmits, to a user equipment (UE), data symbols including the data representing the control element field via a physical downlink shared channel (PDSCH) transmission occasion;
wherein the processor waits for a pre-configured period of time after a last data symbol on the PDSCH transmission occasion is transmitted before determining whether an acknowledgement message indicating the beam-switching command was successfully decoded is received from the UE after the pre-configured period of time, and
changes a beam configuration for downlink transmission in response to receiving the acknowledgement message after the pre-configured period of time.

27. The BS of claim 26, wherein the control element field includes any of:
a control element field of a medium access control (MAC) message;
a UE-specific downlink control information (DCI) field; and
a group-common DCI field.

28. The BS of claim 27, wherein the pre-configured period of time is defined in a form of a plurality of milliseconds or a plurality of symbol times.

29. The BS of claim 27, wherein the transceiver further:
    receives, from the UE, an indication of the pre-configured period of time determined based on a processing capability of the UE, wherein the configured period of time allows sufficient time for the UE to parse the control element field of the MAC message.

30. The BS of claim 26, wherein the pre-configured period of time is a pre-configured parameter defined in a wireless communication protocol, and the method comprises:
    retrieving, by the BS, the pre-configured parameter for the period of time specified in the wireless communication protocol.

* * * * *